United States Patent
Aoki et al.

(10) Patent No.: US 6,793,016 B2
(45) Date of Patent: Sep. 21, 2004

(54) VEHICLE AIR CONDITIONING SYSTEM WITH SEAT AIR CONDITIONING UNIT

(75) Inventors: Shinji Aoki, Chiryu (JP); Takeshi Yoshinori, Okazaki (JP); Koji Sakai, Kariya (JP); Yuichi Kajino, Nagoya (JP)

(73) Assignee: DENSO Corporation, Kariya (JP)

( * ) Notice: Subject to any disclaimer, the term of this patent is extended or adjusted under 35 U.S.C. 154(b) by 388 days.

(21) Appl. No.: 09/770,007

(22) Filed: Jan. 25, 2001

(65) Prior Publication Data

US 2001/0022222 A1 Sep. 20, 2001

(30) Foreign Application Priority Data

| Jan. 28, 2000 | (JP) | 2000-020073 |
| Mar. 30, 2000 | (JP) | 2000-095021 |
| Sep. 1, 2000 | (JP) | 2000-264860 |
| Nov. 7, 2000 | (JP) | 2000-339037 |

(51) Int. Cl.[7] .......................... F25B 29/00; B60H 3/00; B60H 1/00
(52) U.S. Cl. .......................... 165/202; 165/42; 165/43; 454/120; 454/907; 236/91 F; 236/49.3
(58) Field of Search .......................... 165/202, 42, 43; 454/120, 907; 297/180.1; 62/244, 261; 236/91 F, 91 C, 49.3

(56) References Cited

U.S. PATENT DOCUMENTS

| 4,426,852 A | * | 1/1984 | Nishimura et al. | 165/43 |
| 4,434,932 A | * | 3/1984 | Hara et al. | 165/43 |
| 4,899,930 A | * | 2/1990 | Kagohata et al. | 236/91 F |
| 4,938,033 A | * | 7/1990 | Ogihara et al. | 165/43 |
| 5,415,346 A | * | 5/1995 | Bishop | 236/78 D |
| 5,725,052 A | * | 3/1998 | Kawai et al. | 165/203 |
| 6,021,956 A | * | 2/2000 | Haraguchi | |
| 6,079,485 A | | 6/2000 | Esaki et al. | |
| 6,234,398 B1 | * | 5/2001 | Pawlak et al. | 236/91 C |

FOREIGN PATENT DOCUMENTS

| JP | 5-50837 | * | 3/1993 |
| JP | 6-171340 | * | 6/1994 |
| JP | 8-58347 | * | 8/1994 |
| JP | 8-238920 | * | 9/1996 |

* cited by examiner

Primary Examiner—John K. Ford
(74) Attorney, Agent, or Firm—Harness, Dickey & Pierce, PLC

(57) ABSTRACT

A vehicle air conditioning system includes a space air conditioning unit for blowing conditioned air into a passenger compartment, a seat air conditioning unit for blowing air into a vehicle seat, and a control unit for controlling the space air conditioning unit and the seat air conditioning unit. The control unit includes space controlling means for controlling the space air conditioning unit in accordance with a space control value calculated based on a space target air temperature, and seat controlling means for controlling the seat air conditioning unit in accordance with a seat control value calculated based on the space target air temperature. Further, the seat controlling means includes a first seat air conditioning means which determines the seat control value in a steady air conditioning state of the passenger compartment, and a second seat air-conditioning means which determines the seat control value in a transition air-conditioning state of the passenger compartment.

15 Claims, 19 Drawing Sheets

VEHICLE AIR CONDITIONING SYSTEM WITH SEAT AIR CONDITIONING UNIT

CROSS-REFERENCE TO RELATED APPLICATION

This application is related to and claims priority from Japanese Patent Applications No. 2000-20073 filed on Jan. 28, 2000, No. 2000-95021 filed on Mar. 30, 2000, No. 2000-264860 filed on Sep. 1, 2000, and No. 2000-339037 filed on Nov. 7, 2000, the contents of which are hereby incorporated by reference.

BACKGROUND OF THE INVENTION

1. Field of the Invention

The present invention relates to a vehicle air conditioning system including a space air conditioning unit that introduces conditioned air into a passenger compartment, and a seat air conditioning unit that introduce air into a vehicle seat.

2. Description of the Related Art

In a conventional vehicle air conditioning system disclosed in JP-A-10-297243 corresponding to U.S. Pat. No. 6,079,485, a seat air conditioning unit and a space air conditioning unit are provided. Further, a control unit is provided to change an operating condition or a set information of the space air conditioning unit based on a seat temperature of a vehicle, an operating condition of the seat air conditioning unit or a set information of the seat air conditioning unit. The control unit uses a seat set temperature for the seat air conditioning unit as a set temperature for the space air conditioning unit so that an air conditioning operation of a passenger compartment is performed.

Conversely, in a vehicle air conditioning system, a control unit is provided to change an operating condition or a set information of a seat air conditioning unit based on an operating condition or a set information of a space air conditioning unit. This control unit uses a set temperature for the space air conditioning unit as a seat set temperature for the seat air conditioning unit so that an air conditioning operation of a vehicle seat is performed. Specifically, both the space and seat air conditioning units operate in the same operation condition using one set information (e.g., one side set temperature). When the one set information for one of the space and seat air conditioning units is changed, the other set information of the other unit is changed.

However, when an air conditioning load on the space air conditioning unit is large, the seat air conditioning unit is operated with a large capacity on the basis of the set temperature of the space air conditioning unit. Therefore, the seat air conditioning unit exercises an excessively high air conditioning ability in a steady state. Consequently, the seat is cooled excessively in summer and is heated excessively in winter, and an uncomfortable feeling may be given to a passenger on the vehicle seat.

The foregoing problem is serious with a vehicle air conditioning system in which a seat air conditioning unit uses warm air or cool air supplied from a space air conditioning unit for seat heating or seat cooling. Even if an air temperature level of the space air conditioning unit is in a steady state, an air temperature level (thermal sensation level) of the seat air conditioning unit is liable to be excessively low or excessively high, and therefore, an uncomfortable feeling may be given to a passenger on the vehicle seat. Consequently, while the air conditioning system is in a heating mode in winter, the passenger's face will be flushed by warm air.

When the set information for the seat air conditioning unit is changed, the set information for the space air conditioning unit changes accordingly. Therefore, the space air conditioning unit is unable to create a properly air conditioned atmosphere for a passenger seated on a seat not provided with the seat air conditioning unit, and an uncomfortable feeling may be given to the passenger on this seat.

SUMMARY OF THE INVENTION

In view of the foregoing problems, it is an object of the present invention to provide a vehicle air conditioning system capable of achieving comfortable space air conditioning performance and comfortable seat air conditioning performance conforming to passenger's temperature feeling regardless of season.

It is an another object of the present invention to provide a vehicle air conditioning system having a seat air conditioning unit provided in a vehicle seat, which can maintain a set thermal sensation level of a seat surface set by a passenger on the vehicle seat even when an air conditioning state of a passenger compartment is changed.

It is a further another object of the present invention to provide a vehicle air conditioning system having a seat air conditioning unit provided in a vehicle seat, which can maintain an air conditioning state of a passenger compartment desired by a passenger on an another vehicle seat where the seat air conditioning unit is not provided, even when a passenger on the vehicle seat where the seat air conditioning unit is provided changes a thermal sensation level of a seat surface.

According to the present invention, in a vehicle air conditioning system having a space air conditioning unit and a seat air conditioning unit, a control unit controls the space air conditioning unit and the seat air conditioning unit in accordance with a detection value of a thermal load of the vehicle. The control unit includes space calculation means for calculating a space target air temperature to be blown into the passenger compartment based on the detection value of the thermal load of the vehicle and a set temperature set by a passenger, space controlling means for controlling the space air conditioning unit in accordance with a space control value calculated based on the space target air temperature, and seat controlling means for controlling the seat air conditioning unit in accordance with a seat control value calculated based on the space target air temperature. Further, the seat controlling means includes first seat air conditioning means which determines the seat control value in a steady air-conditioning state of the passenger compartment, and second seat air-conditioning means which determines the seat control value in a transition air-conditioning state of the passenger compartment. Accordingly, in the vehicle air conditioning system, comfortable space air conditioning performance of the passenger compartment and comfortable seat air conditioning performance conforming to passenger's temperature feeling can be obtained regardless of season.

Preferably, the space control value of the space controlling means is set based on the space target air temperature in such a manner an air amount blown into the passenger compartment is increased when the space target air temperature is lower than a first predetermined value or is higher than a second predetermined value higher than the first predetermined value, and the seat control value of the first seat air conditioning means is set based on the space target air temperature in such a manner that an air amount blown into the seat through the seat air conditioning unit is decreased when the space target air temperature is lower than the first predetermined value or is higher than the second predetermined value. Accordingly, when the space target air temperature is lower than the first predetermined value, that is, when a difference between the set temperature and temperature of air blown into the passenger compartment becomes larger, the air amount blown into the passenger compartment is made larger as the temperature of air blown into the passenger compartment is lower. However, the air amount blown from a seat surface of the seat is made smaller as the temperature of air blown into the passenger compartment is lower. Thus, super-cooling for a passenger on the seat can be prevented in cooling operation where the space target air temperature is lower than the first predetermined value. Similarly, super-heating for the passenger on the seat can be prevented in heating operation where the space target air temperature is higher than the second predetermined value.

Preferably, the control unit has air-conditioning state determining means for determining whether or not an air conditioning state of the passenger compartment is in the steady air-conditioning state or in the transition air-conditioning state, and the air-conditioning state determining means determines the steady air-conditioning state or the transition air-conditioning state by a steady state discrimination based on the set temperature and an inside air temperature among the detection value of the thermal load. Accordingly, the steady air-conditioning state or the transition air-conditioning state can be accurately determined.

Preferably, the control unit includes air-conditioning switching control means which gradually changes the seat control value from a value corresponding to the transition air-conditioning state to a value corresponding to the steady air-conditioning state, at an initial time of the steady air-conditioning state, immediately after the transition air-conditioning state. Therefore, even in the initial time of the steady air-conditioning state immediately after the transition air-conditioning state, it can restrict an unpleasant feeling from being given to the passenger on the seat.

Further, the seat air conditioning unit includes a seat air conditioning case defining a seat air passage through which at least one of conditioned air from the space air conditioning unit and inside air from the passenger compartment flows toward a seat surface of the seat, a seat temperature changing member which changes temperature of air blown from the seat surface through the seat air passage, a seat blower disposed in the seat air passage for generating an air flow in the seat air passage toward the seat surface, and a seat temperature setting member which sets a thermal sensation level of the seat surface to a desired thermal sensation level. The control unit has operation state determining member for determining an operation state of the passenger compartment, and the control unit controls the seat temperature changing member and the seat blower to obtain the desired thermal sensation level of the seat surface, in the operation state of the space air conditioning unit. Because the control unit controls the seat temperature changing member and the seat blower to obtain the desired thermal sensation level of the seat surface, an unpleasant feeling is not given to a passenger on the vehicle seat. Accordingly, a set thermal sensation level of the seat surface set by the passenger on the vehicle seat can be maintained even when an air conditioning state of the passenger compartment is changed. Further, even when the thermal sensation level of the seat surface is changed in accordance with a passenger's request, air-conditioning capacity of the space air conditioning unit is not changed. Accordingly, the air conditioning state of the passenger compartment desired by a passenger on an another vehicle seat where the seat air conditioning unit is not provided can be maintained, even when the passenger on the vehicle seat where the seat air conditioning unit is provided changes the thermal sensation level of the seat surface.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Figure 1:
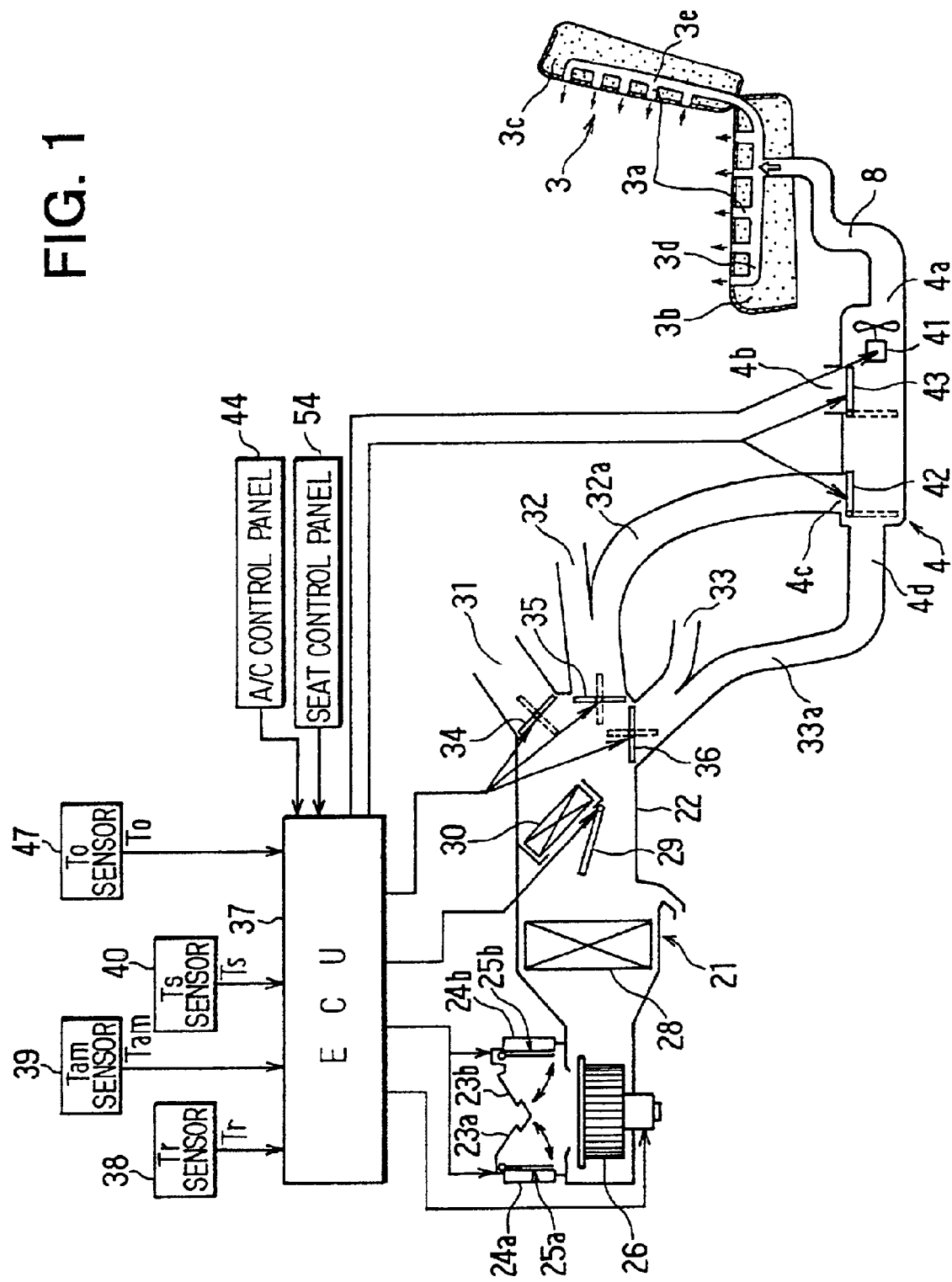
FIG. 1 is a schematic view of a vehicle air conditioning system having a space air conditioning unit and a seat air conditioning unit, according to a first preferred embodiment of the present invention.

Preferred embodiments of the present invention will be described hereinafter with reference to the accompanying drawings.

A vehicle air conditioning system according to a first embodiment of the present invention will be described hereinafter with reference to FIGS. 1 to 10. First, a space air conditioning unit 21 will be described with reference to FIG. 1. An air duct 22 is provided with an outside air intake openings 23a and 23b for taking in outside air (fresh air) outside a passenger compartment and inside air inlets 24a and 24b for taking in inside air (air inside a passenger compartment at its upstream portion. An mixing amount ratio between inside air and outside air is adjusted by adjusting the respective positions of inside/outside air doors 25a and 25b.

A blower 26 is disposed in the air duct 22. An evaporator 28 of a refrigerant cycle system (not shown), an air mixing door 29 and a heater core 30 through which engine cooling water is circulated are disposed in the air duct 22 at a downstream air side of the blower 26, in this order. An air mixing ratio between air passing through the heater core 30 and air bypassing the heater core 30 is adjusted by adjusting an opening degree of the air mixing door 29 so that the temperature of air blown into the passenger compartment is adjusted.

The air duct 22 is provided in its downstream air portion with a defrosting air outlet 31 connected by a duct to defrosting nozzles (not shown) from which conditioned air is blown toward a windshield of the vehicle, a face air outlet 32 connected by a duct to upper blowing openings (not shown) from which conditioned air is blown toward passengers' upper bodies, and a foot air outlet 33 connected by a duct to lower blowing openings (not shown) from which conditioned air is blown toward passengers' feet. Flow control doors 34, 35, 36 (mode switching door) are disposed at upstream air sides of the air outlets 31, 32, 33, respectively.

The space air conditioning unit 21 is controlled by an electronic control unit (abbreviated to "ECU") 37. An inside air temperature sensor 38, an outside air temperature sensor 39 and a sunlight sensor 40 for measuring an intensity of solar radiation are connected to the ECU 37. Signals Tr, Tam and Ts provided by the inside air temperature sensor 38, the outside air temperature sensor 39 and the sunlight sensor 40 are input to the ECU 37. That is, the inside air temperature sensor 38 is disposed to detect an inside air temperature Tr, the outside air temperature sensor 39 is disposed to detect an outside air temperature sensor Tam, and the sunlight temperature sensor 40 is disposed to detect a sunlight amount Ts entering into the passenger compartment. Operation signals from an air conditioning control panel 44 disposed in a central section of an instrument panel are also input to the ECU 37.

Figure 2:
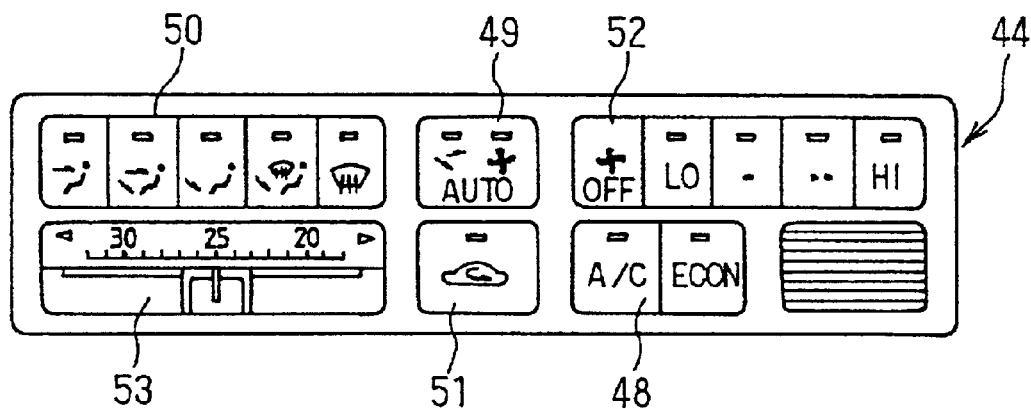
FIG. 2 is a front view showing an air conditioning control panel of the space air conditioning unit according to the first embodiment.

Referring to FIG. 2, the air conditioning control panel 44 is provided with an A/C switch 48 for starting and stopping an air conditioning operation of the space air conditioning unit 21, an operation mode selector switch 49 for selecting an automatic operation mode or a manual operation mode, air blowing mode selector switches 50 respectively for manually selecting a face mode, a bi-level mode, a foot mode, a foot/defroster mode and a defroster mode, an intake mode selector switch 51 for manually selecting an outside air intake mode or an inside air circulation mode, air-blowing level selector switches 52 for manually selecting an air blowing level and a temperature setting switch 53 for manually setting a set temperature, i.e., a desired temperature for air conditioning. When the operation mode selector switch 49 is operated to select an automatic operation mode, functions of the air blowing mode selector switches 50, the intake mode selector switch 51 and the air blowing level selector switches 52 are controlled automatically.

A seat 3 of the vehicle has a seat portion 3b and a backrest portion 3c. The seat portion 3b and the backrest portion 3c are provided with air blowing holes 3a. A seat air conditioning unit 4 is disposed to supply warm air, cool air or air of an ordinary temperature into the air blowing holes 3a. The air blowing holes 3a are provided to communicate with an air passage 3d formed in the seat portion 3b and an air passage 3e formed in the backrest portion 3c, respectively. The air passages 3d and 3e communicate with an air outlet 4a of the seat air conditioning unit 4 through an air supply duct 8. In FIG. 1, the air supply duct 8 is connected to a lower portion of the seat 3. However, the air supply duct 8 may be connected to a side portion of the seat 3. Further, the seat air conditioning unit 4 maybe disposed under the seat portion 3b of the seat 3.

The seat air conditioning unit 4 has an inside air intake opening 4b through which inside air inside the passenger compartment is taken in, a cool air inlet 4c and a warm air inlet 4d, which are disposed at upstream side positions of the air outlet 4a. The cool air inlet 4c is connected to a cool air duct 32a branched from the face outlet 32. The warm air inlet 4d is connected to a warm air duct 33a branched from the foot duct 33.

At downstream air sides of the cool air inlet 4c and the warm air inlet 4d, an air temperature control door 42 (adjustment member) for selectively opening and closing the cool air inlet 4c and the warm air inlet 4d, the inside air intake opening 4b communicating with the passenger compartment, an inside air control door 43 for controlling a flow amount of inside air from the inside air intake opening 4b, and a seat blower 41 for blowing air into the seat 3 are provided. A seat air temperature sensor 47 (To sensor) for measuring temperature To (seat air temperature) of air supplied to the seat 3 is disposed near the air outlet 4a. The control doors 42 and 43 (adjustment member) are driven by actuators, such as servomotors (not shown).

In the first embodiment, four seat air conditioning units 4 are disposed for the front right seat, the front left seat, and the right and the left side of the rear seat of the vehicle, respectively. Four seat air conditioning control panels 54 are embedded in the right and left front doors and a center part of the rear seat, respectively, to enable passengers seated on the front and rear seats to operate the corresponding seat air conditioning units 4, respectively. Accordingly, air-conditioning operations of the four seat air conditioning units 4 can be respectively arbitrarily adjusted. Because each seat air conditioning unit 4 has the same structure, the structure of only one seat air conditioning unit 4 is explained.

Figure 3A:
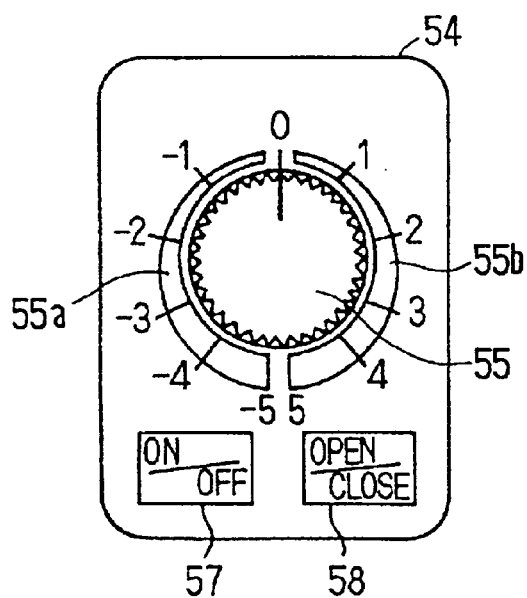
FIG. 3A is a front view of a seat air conditioning control panel of the seat air conditioning unit.

Referring to FIG. 3A, each seat air conditioning control panel 54 is provided with a seat temperature setting switch 55 for manually selecting a desired seat set temperature of the seat air conditioning unit 4, a start/stop switch 57 for starting and stopping the seat air conditioning unit 4, and an operating switch 58 for controlling the inside air control door 43 to open or close the inside air intake opening 4b.

The seat temperature setting switch 55 is a rotary dial switch capable of selectively selecting a seat set temperature Sset in a cool zone 55a or a warm zone 55b.

Figure 3B:
FIG. 3B is a view showing a relationship between a thermal sensation level of a passenger and a temperature setting level of the seat air conditioning control panel, according to the first embodiment.

Since seat air conditioning is of a contact air conditioning system, thermal sensation levels of individual passengers differ widely. Therefore, thermal sensation levels in the cool zone 55a and the warm zone 55b are indicated by indices representing differences of the seat set temperatures from a standard temperature (unfeeling) of 25° C. In the first embodiment, a desired thermal sensation level can be selected from eleven thermal sensation levels, as shown in FIG. 3B. The cool zone 55a is divided into five levels from a slight cool level to a very cold level, and the warm zone 55b is divided into five levels from a slight warm level to a very hot level.

For example, when the passenger feels cold, the seat temperature setting switch 55 is adjusted so that the seat set temperature Sset is set to the index "2". Further, when the passenger feels hot, the seat temperature setting switch 55 is adjusted so that the seat set temperature Sset is set to the index "−4". Thus, the seat air conditioning operation of the seat air conditioning unit can be finely accurately controlled.

In the first embodiment, the plural seat air conditioning control panels 54 are connected to the ECU 37. When the start/stop switch 57 (ON/OFF switch) of one seat air conditioning control panel 54 is firstly tuned on (start), the one seat air conditioning control panel 54 gives a signal to control the space air conditioning unit 21 in connection with the operation of one seat air conditioning unit 4. The other seat air conditioning units 4 combined with the other seats perform the same operation as the one seat air conditioning unit 4 that has been started first, provided that the start/stop switches 57 thereof are turned on. Therefore, changes in the setting of the seat temperature setting switches 55 of the seat air conditioning units 4 excluding the one seat air conditioning unit 4 that has been started first are not accepted. The operating switch 58 is operated to introduce inside air of the passenger compartment into the seat air conditioning unit 4 by opening the inside air intake opening 4b. When the operating switch 58 is turned on (open), the inside air intake opening 4b is fully opened to take in inside air.

Figure 4:
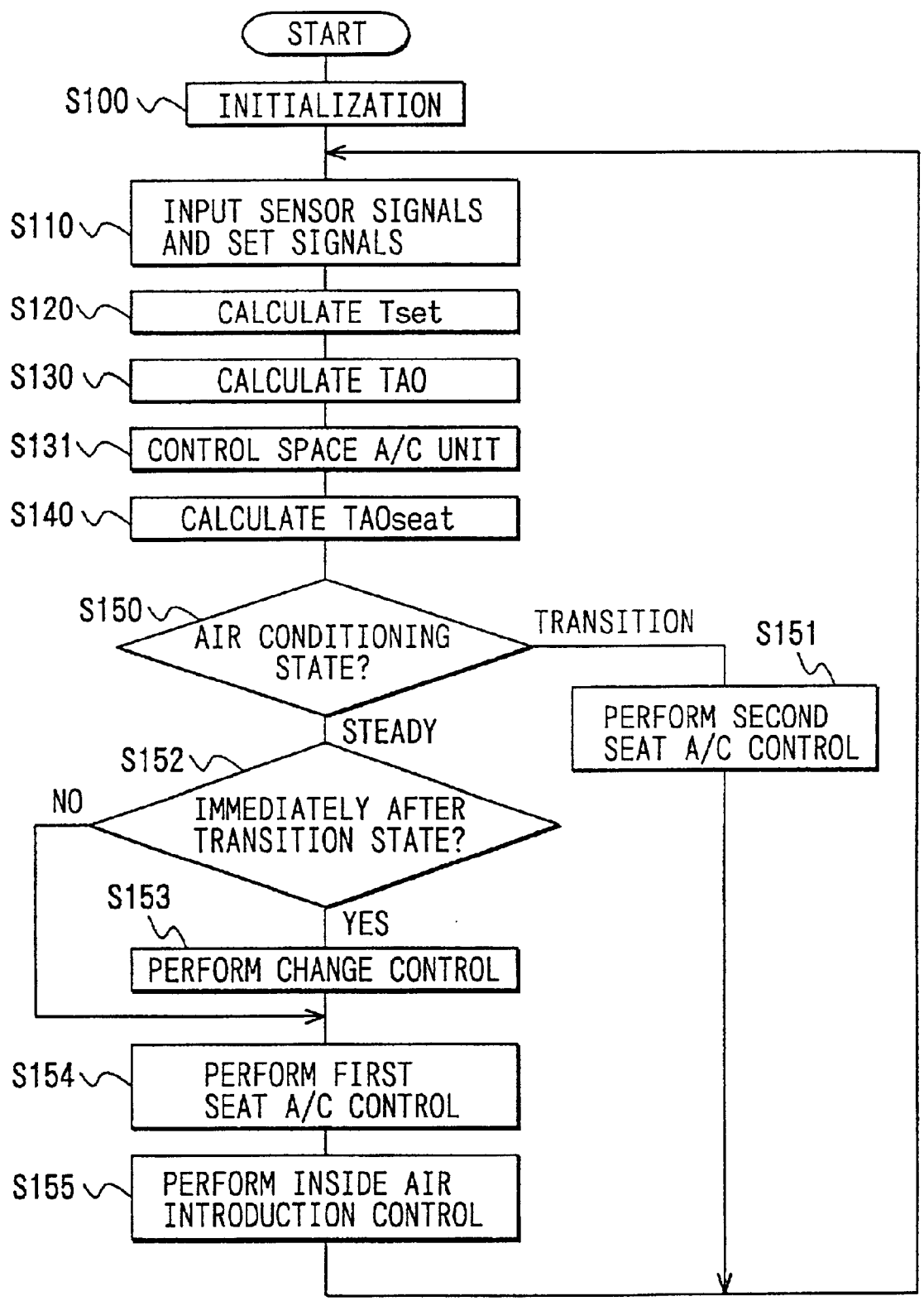
FIG. 4 is a flow diagram showing a control routine of the seat air conditioning unit according to the first embodiment.

The ECU 37 has a microcomputer as a principal component provided with a ROM, not shown, storing a control program shown in FIG. 4. The ECU 37 performs the control program shown in FIG. 4 to control the temperature of air blown into the passenger compartment by the space air conditioning unit 21 and to control the flow amount and temperature of air blown from the seat air conditioning unit 4 in accordance with the seat set temperature Sset selected by the passenger.

The control program to be executed by the ECU 37 will be described based on the flow diagram shown in FIG. 4. First, when the A/C switch 48 of the air conditioning control panel 44 and the start/stop switch 57 of the seat air conditioning control panel 54 are operated, the control at step S100 is performed. That is, an initialization process for initializing counters and flags to be used in the following operations is carried out at step S100. At step S110, sensor signals and set signals are input. For example, the set signals are a set temperature $T_1$set and a seat set temperature Sset selected by the passenger by operating the temperature setting switch 53 and the seat temperature setting switch 55, respectively. Further, the sensor signals are an inside air temperature Tr from the inside air temperature sensor 38, an outside air temperature Tam from the outside air temperature sensor 39, a sunlight amount from the sunlight amount sensor 40 and a seat air temperature To from the seat air temperature sensor 47.

At step S120, a set temperature Tset is calculated on the basis of the set temperature $T_1$set from the temperature setting switch 53, the outside air temperature Tam and the sunlight amount Ts by using the following formulas (1), (1a) and (1b).

$$Tset = f(T_1set,\ Tam,\ Ts) = T_1set + \Delta Tam + \Delta Ts \tag{1}$$

$$\Delta Tam = (10 - Tam)/20 \tag{1a}$$

$$\Delta Ts = -Ts/1000 \tag{1b}$$

Figure 5A:
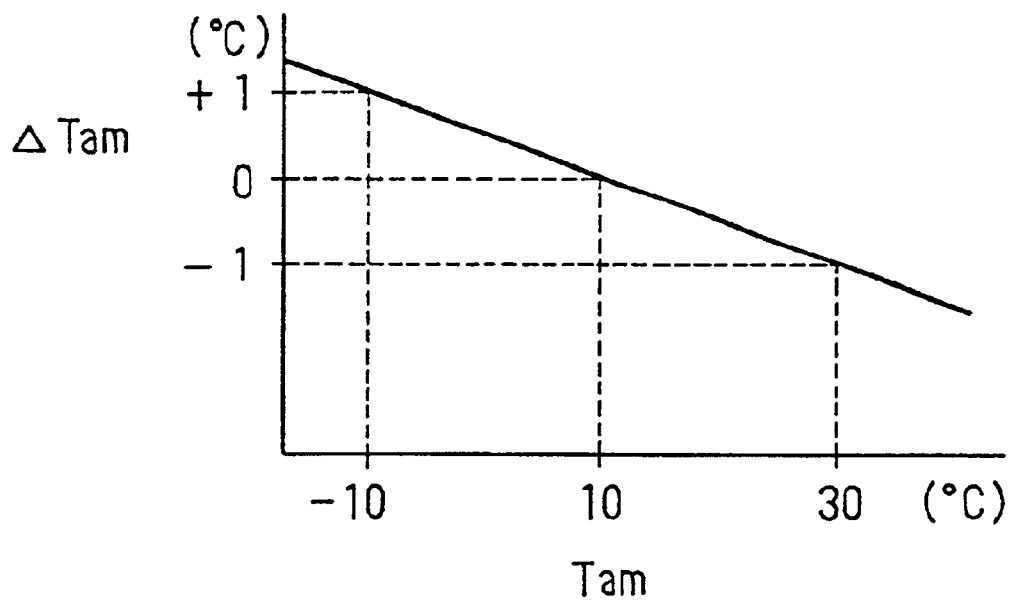
FIG. 5A is a view showing the relationship between an outside air temperature Tam and ΔTam.
Figure 5B:
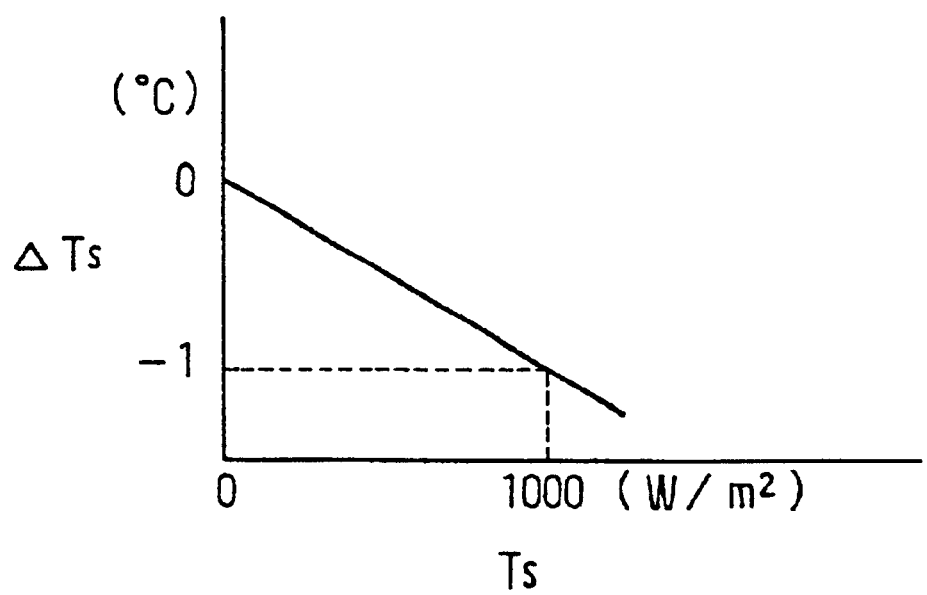
FIG. 5B is a view showing the relationship between a sunlight amount Ts and Δ Ts, according to the first embodiment.

The relationship of the formula (1a) is indicated in the graph of FIG. 5A, and the relationship of the formula (1b) is indicated in the graph of FIG. 5B.

After the set temperature Tset is calculated, a target air temperature TAO necessary to maintain the interior of the passenger compartment at the set temperature Tset is calculated by using formula (2) at step S130.

$$TAO = K1 \times Tset - K2 \times Tr - K3 \times Tam - K4 \times Ts + C \tag{2}$$

where K2, K2, K3 and K4 are coefficients and C is a constant.

Thus, the parameters of the operating conditions for the space air conditioning unit 21, including an operation mode of conditioned air blowing into the passenger compartment, and the temperature and the flow rate of the conditioned air are determined based on the calculated target air temperature TAO for the space air conditioning unit 21.

At step S131, the air conditioning operation of the space air conditioning unit 21 is controlled. Specifically, the flow control doors 34, 35 and 36 of the space air conditioning unit 21 are controlled on the basis of the target air temperature TAO to set automatically an air outlet mode of the space air conditioning unit 21. The respective positions of the inside/outside air doors 25a and 25b for opening and closing the outside air intake openings 23a and 23b and the inside air inlets 24a and 24b are adjusted based on the target air temperature TAO for the space air conditioning unit 21. An operation position of the air mixing door 29 is determined based on the target air temperature TAO to control the temperature of the air flowing into the passenger compartment. An air blowing level (air flow amount) of the blower 26 is controlled to a desired level based on the target air temperature TAO in accordance with the characteristic view shown in FIG. 6, so that the temperature in the passenger compartment is adjusted to the set temperature Tset. In an initial stage of air conditioning operation, in which air conditioning load on the air conditioning system is large, immediately after the start of the air conditioning system, the conditioned air is supplied with a high air blowing level (i.e., a high space control value) to adjust the atmosphere of the passenger compartment to a comfortable atmosphere as quickly as possible. After the inside air temperature Tr has increased near to the set temperature Tset and air conditioning load on the air conditioning system has decreased, the air blowing level (space control value) of conditioned air is decreased.

When the air conditioning system starts in winter in which the temperature of the engine cooling water is low, a warming-up control operation that increase the flow rate of the conditioned air gradually according to the rise of the temperature of the engine cooling water is performed to avoid blowing cold air into the passenger compartment and giving an uncomfortable feeling to a passenger. When the air conditioning system starts in summer, a delay control operation (cool-down control operation), that starts an air blowing operation after the evaporator 28 has been sufficiently cooled, is executed to avoid giving uncomfortable feeling, due to warm air blowing into the passenger compartment to a passenger.

At step S140 in FIG. 4, a seat target air temperature $TAO_{seat}$ for the seat air conditioning unit 4 is calculated on the basis of the space target air temperature TAO calculated by using formula (2). The seat target air temperature $TAO_{seat}$ is calculated counting on a temperature increase or a temperature decrease, by calculating the thermal load of the seat 3 on the basis of the seat set temperature $S_{set}$, the seat air temperature To and the inside air temperature Tr read at step S110. The seat target air temperature TAOseat of conditioned air to be blown through the seat 3 is estimated in connection with the air conditioning operation (the space target air temperature TAO) of the space air condition unit 21.

At step S150 (air conditioning state determining means), it is determined whether or not an air conditioning state is in a steady state or in a transition state by using an air condition determination expression. That is, the steady state or the transition state is determined using a mean difference ($\Sigma=|Tset-Tr|$) between the inside air temperature Tr and the set temperature Tset, measured in a predetermined time.

For example, to obtain the mean value of the variations of the inside air temperature Tr and the set temperature Tset, a difference $\Sigma=|Tset-Tr|$ obtained by averaging the differences calculated every four seconds for two minutes (n times) may be used for comparison with a predetermined value $\delta$. It is determined that the air conditioning state of the passenger compartment is in a transition state when $\Sigma>\delta$. It is determined that the air conditioning state is in a steady state when $\Sigma \leq \delta$.

The predetermined value $\delta$ is an optional valve determined through experiments conducted to determine whether the seat air conditioning operation is in a super-cooling mode or in a super-heating mode when the inside air temperature Tr is stable.

An example of the air conditioning determination expression will be explained briefly in cooling operation and heating operation of the space air conditioning unit 21. When the air conditioning state of the space air conditioning unit 21 is in a transition state while the space air conditioning unit 21 is operating in the cooling operation, the inside air temperature Tr of the passenger compartment is high and hence the air condition determination expression is not satisfied. For example, suppose that n=4, $\delta$=20, Tset=25° C. and Tr =32° C. to simplify calculation. In this case, $\Sigma$=28 and $\Sigma>\delta$. Therefore, it is determined that the air conditioning state of the passenger compartment is in a transition state. When the inside air temperature Tr decreases and Tr=30° C., $\Sigma$=20 and $\Sigma \leq \delta$. Therefore, in this case, it is determined that the air conditioning state of the passenger compartment is in a steady state.

When the air conditioning state of the passenger compartment is in a transition state while the space air conditioning unit 21 is operating in a heating mode, the inside air temperature Tr is low and the air conditioning determination expression is not satisfied. For example, when n=4, $\delta$=20, Tset=25° C. and Tr=17° C., $\delta$=32 and hence $\Sigma>\delta$. Therefore, the air conditioning state of the passenger compartment is in a transition state. When Tr=20° C. , $\Sigma$=20 and hence $\Sigma \leq \delta$. Therefore, in this case, it is determined that the air conditioning state is in a steady state.

Figure 7:
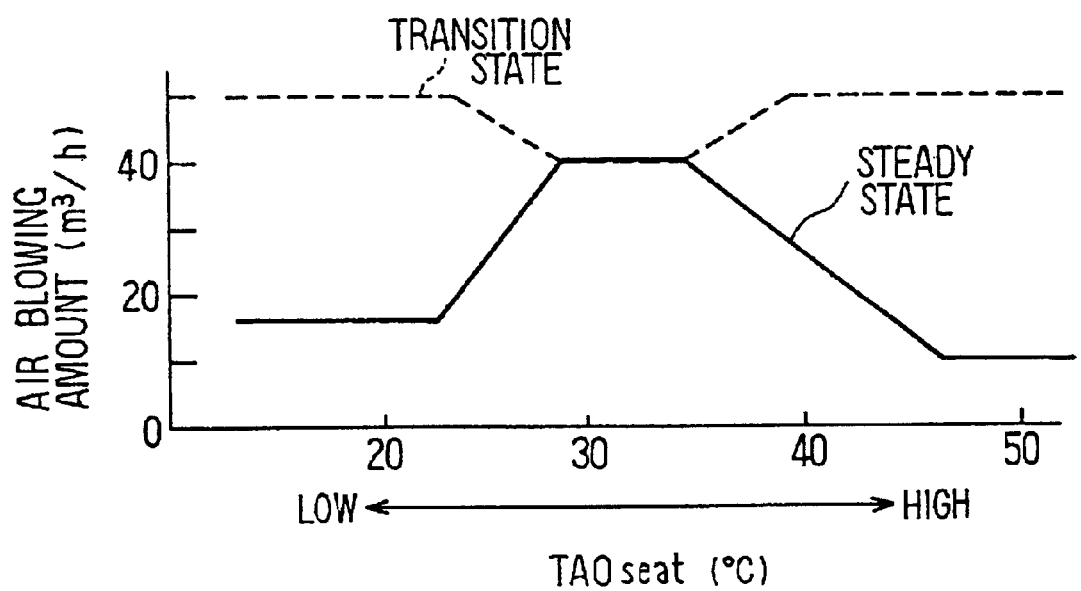
FIG. 7 is a characteristic view showing a relationship between an air blowing amount of a seat blower and a seat target air temperature $TAO_{seat}$ of the seat air conditioning unit in a steady state of a passenger compartment and in a transition state of the passenger compartment, according to the first embodiment.

When it is determined that the air conditioning state of the passenger compartment is in the transition state, step S151 (second seat air conditioning means) is executed. That is, at step S151, a second seat air conditioning control is performed. As shown in FIG. 7, in the second seat air conditioning control, an air blowing amount (seat control value) of the seat blower 41 is controlled based on the seat target air temperature $TAO_{seat}$ in accordance with the transition state graph shown by the chain line in FIG. 7 so that air temperature to be introduced into the seat 3 is controlled. That is, when the air conditioning state of the passenger compartment is in a transition state, the second seat air conditioning control is performed so that the air blowing amount to be blown into the seat 3 is controlled in accordance with the transition state graph of FIG. 7. On the other hand, when the air conditioning control of the passenger compartment is in a steady state, a first seat air conditioning control is performed so that an air blowing amount is changed in accordance with the steady state graph shown by the solid line in FIG. 7.

In the second seat air conditioning control, air supplied to the seat 3 is controlled based on the transition state graph in FIG. 7 so that the seat set temperature $S_{set}$ is obtained. In an initial stage of air conditioning operation (cooling or heating) immediately after the start of the air conditioning system, in which air conditioning load on the air conditioning system is large, the conditioned air is supplied by a high air blowing amount to adjust the atmosphere of the seat to a comfortable atmosphere as quickly as possible. After the seat air temperature To is increased near to the seat set temperature $S_{set}$ and air conditioning load on the air conditioning system is decreased, the air blowing amount of the conditioned air is reduced. This second seat air-conditioning control is similar to the air-blowing amount control of the space air conditioning unit 21 described in FIG. 6.

The steady state graph shown by the solid line in FIG. 7 indicates the first seat air conditioning control showing the relationship between the seat target air temperature $TAO_{seat}$ and air blowing amount (seat control value) of the seat blower 41 in a steady state. In the steady state, the air blowing amount from the seat blower 41 is reduced when the seat target air temperature $TAO_{seat}$ is high or is low.

Step S152 is performed, when it is determined that the inside air temperature Tr of the passenger compartment is nearly equal to the set temperature Tset. That is, when it is determined that the air conditioning state of the passenger compartment is in a steady state, the control of step S152 is performed. At step S152, it is determined whether or not the air conditioning state has just changed from a transition state to a steady state. When it is determined that the steady state is in an immediately after the transition state at step S152, step S153 (air-conditioning switching control means) is executed.

At step S153, the air blowing amount of the seat blower 41 is controlled by the control characteristic indicated by solid line for the steady state. However, since this air amount control in the steady state immediately after the transition state is different from a change of the air amount control in the transition state, the change control is executed at step S153 to change the air blowing amount stepwise to a predetermined flow rate.

More concretely, the air blowing amount is changed gradually by one level every four seconds to the predetermined flow rate. After the predetermined flow rate has been set, the first seat air conditioning control indicated by the solid line in FIG. 7 for the steady state is continued at step S154 (first seat air-conditioning means), and the seat air conditioning unit 4 is controlled so that the seat air temperature To becomes the seat set temperature $S_{set}$.

The steady state control (first seat air-conditioning control) of the seat air conditioning unit 4 will be explained. The control of the air blowing amount corresponding to the seat target air temperature $TAO_{seat}$ in the steady state shown in FIG. 7 is determined through experiments.

Figure 8:
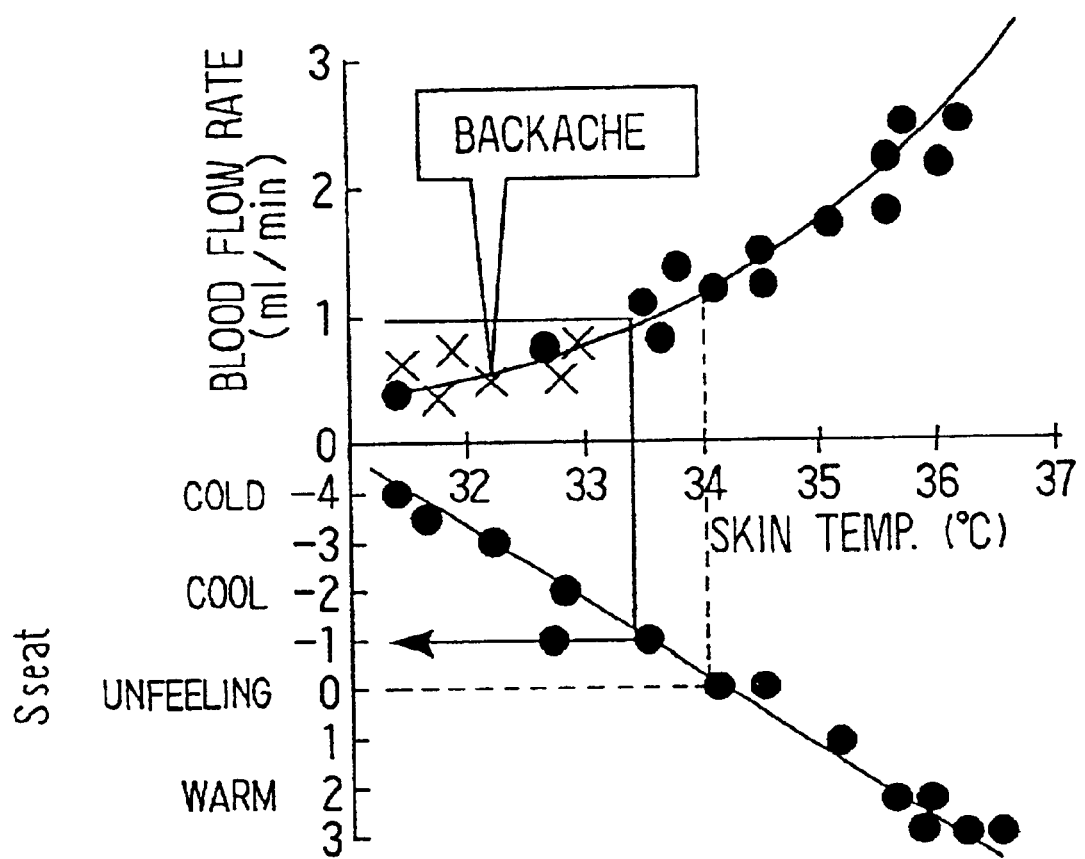
FIG. 8 is a view showing a relationship between a skin temperature of a passenger, a blood flow rate of the passenger and a thermal sensation level Sseat of the passenger, according to the first embodiment.

In the experiments of FIG. 8, conditioned air having been controlled due to the space target air temperature TAO of the space air conditioning unit 21 in a cooling operation is supplied into the passenger compartment, conditioned air corresponding to the seat target air temperature $TAO_{seat}$ is supplied to the seat air conditioning unit 4, and air conditioning control in the transition state shown in FIG. 7 is performed. In the conditions, the passenger's skin temperature is measured when conditioned air with a seat air temperature To is supplied to the seat 3. FIG. 8 shows the relationship between blood flow rate and the measured skin temperature, and the relationship between thermal sensation level $S_{seat}$ and the measured skin temperature. Here, the seat air temperature To supplied to the seat 3 is changed by changing the target air temperature TAO according to the thermal load of the vehicle. That is, the thermal load of the vehicle is greater, the space target air temperature TAO is lower and the seat air temperature To is lower, when the skin temperature is lower.

It is known from data obtained after the cooling operation is continued for 20 minutes that the greater the thermal load of the vehicle and the lower the seat air temperature To, the lower is the blood flow rate. For example, when the skin temperature is 33.4° C. or below and the thermal sensation level $S_{seat}$ is −1 (slightly cool) or lower, the passenger feels cold and tired and have a backache. It was found that the seat 3 is cooled excessively before the passenger compartment is air conditioned properly and gives the passenger an uncomfortable feeling when thermal load on the vehicle is large and the seat air temperature is low because seat air conditioning is of a contact air conditioning system that blows conditioned air directly against the skin. According to experiments by the inventors, the seat air temperature is about 24.5° C. or above for maintaining skin temperature at 34° C.

Figure 9A:
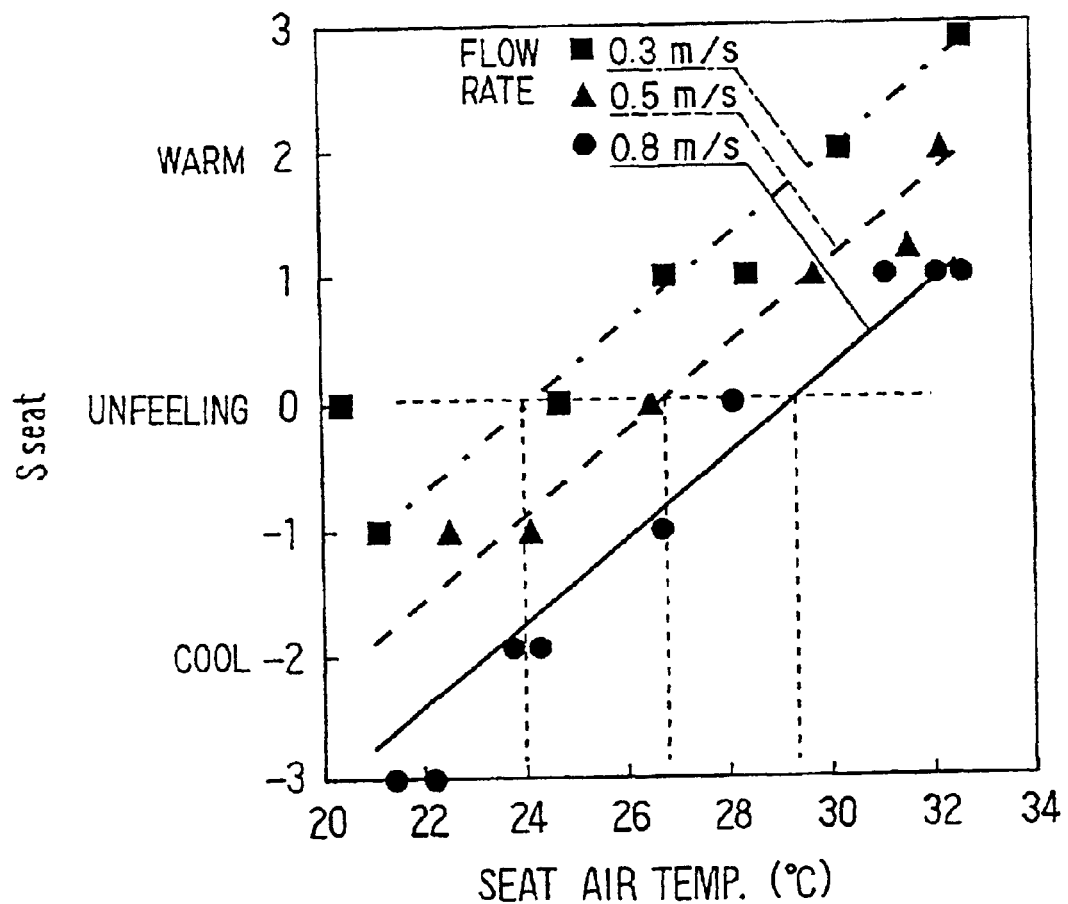
FIG. 9A is a graph showing a relationship between a seat air temperature (i.e., seat supply air temperature) and the thermal sensation level Sseat.

FIG. 9A shows a relationship between the thermal sensation level $S_{seat}$ and an air flow rate corresponding to the seat air temperature. As shown in FIG. 9A, the thermal sensation level $S_{seat}$ can be improved by reducing air blowing rate when seat air temperature is fixed.

Figure 9B:
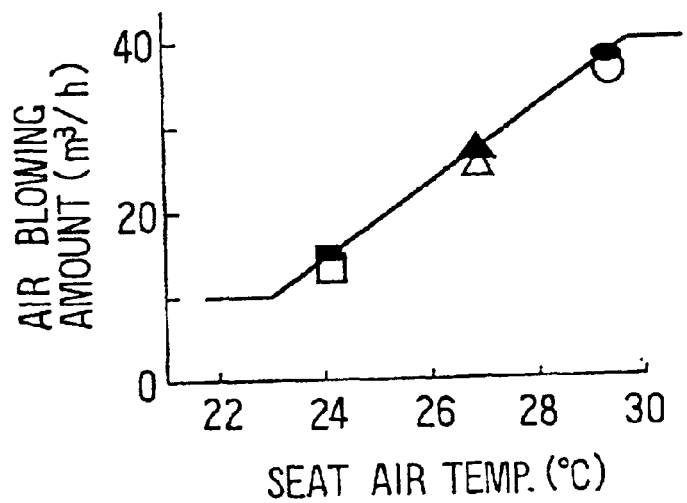
FIG. 9B is a graph showing a relationship between a seat air blowing amount and the seat air temperature when the thermal sensation level is 0 (no thermal sensation) or above, according to the first embodiment.

FIG. 9B shows a relationship between air blowing amount and the seat air temperature when the thermal sensation levels of 0 (no thermal sensation) or above. In the first embodiment, in the first seat air conditioning control of a steady state during the cooling operation, the air blowing amount is controlled according to the characteristic shown in FIG. 9B. Further, when the seat target temperature is lower than a predetermined temperature (24.5° C.), the supply of the conditioned air from the space air conditioning unit 21 is stopped while the inside air control door 43 is opened so that the inside air intake opening 4b is fully opened. In this case, since the temperature of air in the passenger compartment is controlled at about 25° C., the skin temperature does not decrease below 34° C. and excessive cooling can be prevented.

When the inside air temperature Tr drops to 23° C. or below, the inside air control door 43 is operated to keep the inside air intake opening 4b in a fully open state, the seat blower 41 is stopped to stop blowing conditioned air through the seat 3 to prevent excessive cooling. That is, when the set temperature $T_1$set of the passenger compartment is low and the passenger compartment is air conditioned in a slightly cool state, the seat air conditioning operation can be stopped for preventing excessive cooling.

The ECU 37 calculates a control amount converted into the seat target air temperature $TAO_{seat}$ on the basis of seat air temperature. The seat blower 41 and the inside air control door 43 are controlled according to the controlled amount shown in FIG. 7. Incidentally, the seat air temperature of 24.5° C. corresponds to a seat target air temperature $TAO_{seat}$ of about 20° C.

Figure 6:
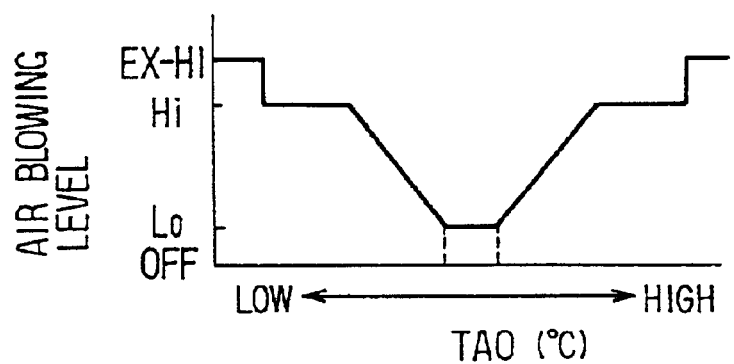
FIG. 6 is a characteristic view showing a relationship between an air blowing amount of a blower and a space target air temperature TAO of the space air conditioning unit according to the first embodiment.

A controlled amount to be controlled by the first seat air conditioning control is different from that of FIG. 6 which is the air blowing amount control of the space air conditioning unit 21. That is, as shown in FIG. 6, the space air conditioning unit 21 increases the air blowing amount (space control value) when the space target air temperature TAO is smaller than the predetermined value in cooling operation. On the other hand, in the first seat air conditioning control (steady control), the seat air conditioning unit 4 reduces the air blowing amount (seat control value) to improve the thermal sensation level when the space target air temperature TAO is smaller than the predetermined value in cooling operation, so that a comfortable feeling is ensured. The foregoing is the air blowing amount control in the cooling operation among the first seat air conditioning control.

Figure 10A:
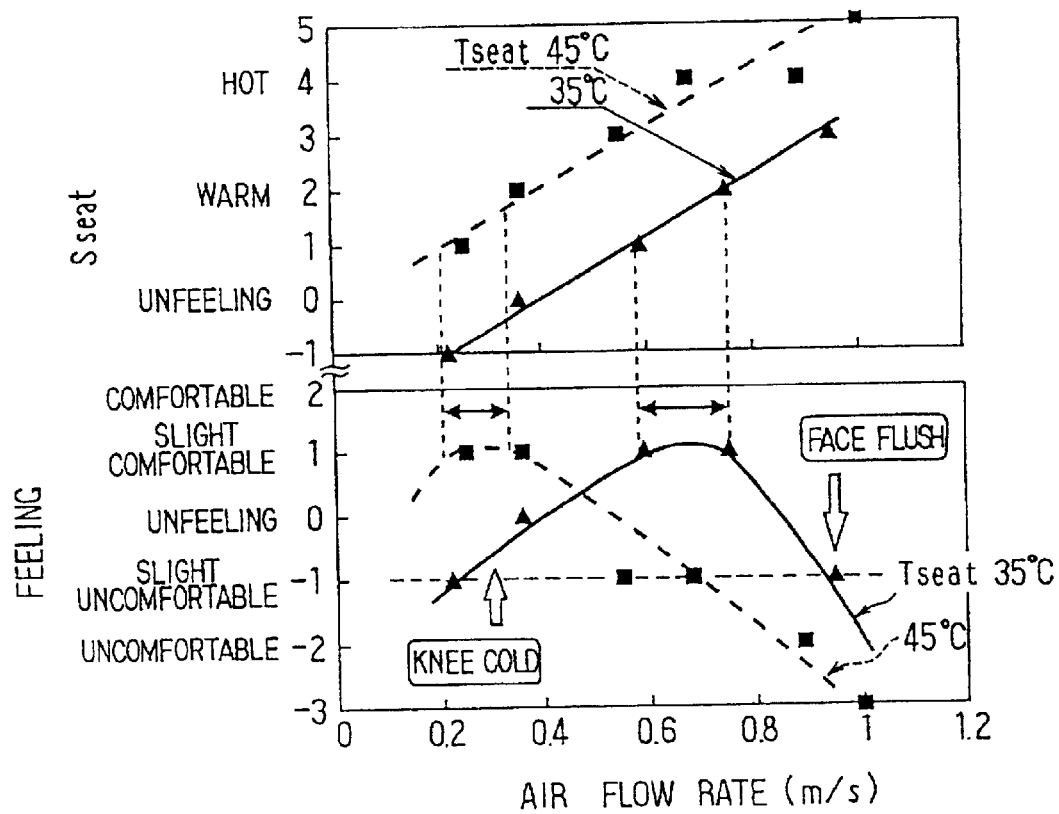
FIG. 10A is a graph showing a relationship between the thermal sensation level Sseat and a passenger's feeing, and the seat air temperature and an air flow rate.

In the heating operation, the space air conditioning unit 21 blows conditioned air controlled due to the space target air temperature TAO into the passenger compartment. On the other hand, the seat air conditioning unit 4 performs the second seat air conditioning control based on the transition state graph shown in FIG. 7. FIG. 10A shows a relationship between the thermal sensation level $S_{seat}$, the air flow rate (velocity) and the feeling given to a passenger. As shown in FIG. 10A, the passenger feels slightly uncomfortable and the passenger's knees feel chilly when the thermal sensation level $S_{seat}$ is −1 (slightly cool) if air having a low temperature is blown into the seat 3 at a low air flow rate. On the other hand, the passenger's face is flushed and the passenger feels uncomfortable when air having a high temperature is blown into the seat 3 at a high air flow rate.

Figure 10B:
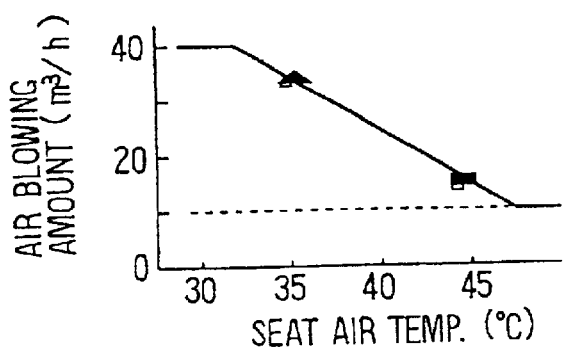
FIG. 10B shows a relationship between the seat air blowing amount corresponding to the air flow rate (velocity) and the seat air temperature at a amenity level 1 (slightly comfortable) or above, according to the first embodiment.

FIG. 10B shows a relationship between the seat air blowing amount corresponding to the air flow rate (velocity) and the seat air temperature at a amenity level 1 (slightly comfortable) or above. The first seat air conditioning control is performed on the basis of a characteristic represented by a curve shown in FIG. 10B when the space air conditioning operation is in the steady state during the heating operation.

Similarly to the cooling operation, in the heating operation, the ECU 37 calculates a controlled amount converted into the seat target air temperature $TAO_{seat}$ on the basis of the seat air temperature shown in FIG. 10B and controls the seat blower 41 on the basis of the controlled amount shown in FIG. 7.

Similarly to the cooling operation, in the heating operation, the controlled amount to be controlled by the first seat air conditioning control in the steady state is different from FIG. 6 showing the air-blowing amount control of the space air conditioning unit 21. That is, the space air conditioning unit 21 increases the air blowing amount when the space target air temperature TAO is not smaller than a predetermined value. On the other hand, the seat air conditioning unit 4 ensures a comfortable feeling by reducing the air blowing amount to prevent excessive heating. Thus, the first seat air conditioning control is executed at step S154 to determine the air blowing amount, i.e., the seat control value, on the basis of the passenger's thermal sensation level $S_{seat}$.

Next, step S155 (inside air introducing control means) will be described. When solar radiation is intense and outside air temperature is high in hot weather like that in summer, the set temperature Tset calculated by the ECU 37 is low and the space air conditioning unit 21 operates to blow air with a space target air temperature TAO on a high air conditioning load. In this case, the seat air conditioning unit 4 is liable to operate in the cooling mode. Therefore, when the seat air temperature To is lower than the seat target air temperature $TAO_{seat}$, the position of the inside air control door 43 is adjusted so that the inside air introduced through the inside air intake opening 4b and cool air supplied from the space air conditioning unit 21 are mixed. That is, an inside air introduction control is performed so that temperature of air flowing into the seat 3 is adjusted.

In the heating operation in winter, when the space air conditioning unit 21 operates for a large air conditioning load, the position of the inside air control door 43 is adjusted so that the inside air sucked through the inside air intake opening 4b and warm air supplied from the space air conditioning unit 21 are mixed. The inside air introduction control is thus performed so that air having a predetermined temperature is blown into the seat 3.

Other operations of the seat air conditioning unit 4 in the cooling mode, the heating mode and an intermediate mode will be explained.

When the space air conditioning unit 21 is operating in the cooling operation, the space target air temperature TAO is lower than the inside air temperature Tr, the face air outlet 32 is opened so that cool air is blown toward the upper side of a passenger in the passenger compartment through the upper blowing openings and the cool air is also supplied into the cool air duct 32a. The seat air conditioning unit 4 operates based on the seat target air temperature $TAO_{seat}$ that is calculated by the seat set temperature Sset, the seat air temperature To and the space target air temperature TAO. It is determined that the seat air conditioning unit 4 is operating in the cooling mode when the seat target air temperature $TAO_{seat}$ is lower than the seat supply air temperature To. In the cooling operation, the air temperature control door 42 is positioned so as to open the cool air inlet 4c, the inside air control door 43 is positioned so as to fully close the inside air intake opening 4b, and the seat blower 41 is controlled by the second seat air conditioning control in the transition state or the first seat air conditioning control in the steady state. Accordingly, in the cooling operation, the seat air temperature control can be performed.

When a passenger seated on the seat 3 changes the seat set temperature Sset by operating the seat temperature setting switch 55, for example, when the seat set temperature Sset is changed from Sset "0" to Sset "−1", i.e., a change of one temperature level toward a cool side from Sset "0", the seat target air temperature $TAO_{seat}$ is lowered by one level for the blown-air temperature control and the air-blowing amount control. When the seat set temperature Sset is changed from Sset "0" to Sset "+1", i.e., a change of one temperature level toward a warm side from Sset "0", the seat target air temperature $TAO_{seat}$ is raised by one level for the blown air temperature control and the air-blowing amount control.

When the space air conditioning unit 21 is operating in the heating mode, the space target air temperature TAO is higher than the inside air temperature Tr. In this case, the foot air outlet 33 is opened so that warm air is blown toward the foot area of the passenger compartment through the lower blowing openings, and the warm air is also supplied into the warm air duct 33a. The seat air conditioning unit 4 operates to control air based on the seat target air temperature $TAO_{seat}$ determined by the seat set temperature Sset, the seat air temperature To and the space target air temperature TAO. It is determined that the seat air conditioning unit 4 is in the heating operation when the seat target air temperature $TAO_{seat}$ is higher than the seat air temperature To. Then, the air temperature control door 42 is positioned so as to open the warm air inlet 4d, the inside air control door 43 is positioned so as to fully close the inside air intake opening 4b, and the seat blower 41 is operated so that warm air is blown toward the seat 3. In the seat blower 41, the air blowing amount can be controlled based on the second seat air conditioning control or the first seat air conditioning control in the heating mode.

When the passenger seated on the seat 3 changes the seat set temperature Sset by operating the seat temperature setting switch 55, for example, when the seat set temperature Sset is changed from Sset "0" to Sset "−1", i.e., a change of one temperature level toward a cool side from Sset "0", the seat target air temperature TAOseat is lowered by one level for the air temperature control and the air-blowing amount control. When the seat set temperature Sset is changed from Sset "0" to Sset "+1", i.e., a change of one temperature level toward a warm side from Sset "0", the seat target air temperature TAOseat is raised by one level for the air temperature control and the air-blowing amount control.

When the space air conditioning unit 21 is operating in the intermediate mode, both the face outlet 32 and the foot outlet 33 are opened. In this case, cool air is blown toward the upper side of the passenger through the upper blowing openings, and warm water is blown through the lower blowing openings toward the lower side of the passenger. Simultaneously, cool air is supplied into the cool air duct 32a and warm air is supplied into the warm air duct 33a. When the seat set air temperature Sset is "0" or a value on the cool side and when the air temperature control door 42 is positioned so as to open the cool air inlet 4c to lower the seat air temperature To, an air temperature control is performed by mixing the inside air of the passenger compartment and the cool air from cool air duct 31a. Even in this case, the air blowing amount blown by the seat blower 41 is controlled by the second seat air conditioning control or the first seat air conditioning control.

When the set seat air temperature Sset is a value on the warm side and when the conditioned air control door 42 is positioned so as to open the warm air inlet 4d to raise the seat air temperature To by supplying warm air, the air temperature control is performed by mixing the inside air of the passenger compartment and the warm air from the warm air duct 33a. Even in this case, the air blowing amount blown by the seat blower 41 is controlled by the second seat air conditioning control or the first seat air conditioning control. The mixing ratio between the cool air and the warm air may be adjusted by the air temperature control door 42 so that the temperature of air blown toward the seat can be controlled.

According to the first embodiment, the ECU 37 for controlling the space air conditioning unit 21 has the first and second seat air conditioning controls for the seat air conditioning unit 4. The first seat air conditioning control is performed in the seat air conditioning unit 4 while the air conditioning operation in the passenger compartment is in a steady state, and the second air conditioning control is performed in the seat air conditioning unit 4 while the air conditioning operation in the passenger compartment is in a transition state. Thus, the ECU 37 controls the space air conditioning unit 21 to control air state of the passenger compartment, while controlling the seat air conditioning unit 4. The seat air conditioning unit 4 is a contact air conditioning system, in which air is directly introduced to a passenger on the seat 3.

For example, when the vehicle is under a burning sun and the thermal load of the vehicle is large, the space air conditioning unit 21 lowers the temperature of the conditioned air and increases the air blowing amount of the conditioned air, even when the air conditioning operation of the passenger compartment is in the steady state. However, in the first embodiment, because the seat air conditioning unit 4 operates with the first seat air conditioning control in the steady state, it can prevent an uncomfortable feeling (super-cooling) from being given to the passenger on the seat 3. On the other hand, even in the steady state of the passenger compartment, the space air conditioning unit 21 raises the temperature of the conditioned air and increases the air blowing amount when the thermal load of the vehicle is large in the heating mode. However, in the first embodiment, because the seat air conditioning unit 4 operates with the first seat air conditioning control in the steady state, it can prevent an uncomfortable feeling (super heating) from being given to the passenger on the seat 3.

In the first embodiment, the seat air temperature and air blowing amount to be blown through the seat 3 are controlled by the first seat air conditioning control that is calculated based on the thermal sensation level $S_{seat}$ of the passenger. Thus, pleasant performance of the passenger compartment can be improved by space air conditioning operation and seat air conditioning operation.

When the air conditioning in the vehicle is in a transition state, such as a state after the vehicle has been parked under a burning sun for a long time, the surface temperature of the seat is very high and quick cooling is necessary. In this case, the space air conditioning unit 21 operates at its maximum air conditioning ability for quick cooling, and the seat air conditioning unit 4 performs the second seat air conditioning control in the transition state that lowers the temperature of air and increases the seat air blowing amount. The second seat air conditioning control of the seat air conditioning unit 4 is similar to the air conditioning control of the space air conditioning unit 21. Accordingly, the passenger compartment and the seat can be quickly cooled, and quickly cooling performance can be improved.

The first air conditioning control and the second air conditioning control of the seat air conditioning unit 4 are set in the ECU 37 by using the thermal load indicating values Tr, Tam and Ts that are used in common with the space air conditioning unit 21, the temperature setting switch 53 and the space target air temperature TAO. Consequently, the cost of the seat air conditioning unit 4 can be reduced.

In the air conditioning control of the space air conditioning unit 21, cool air having a lower temperature is blown into the passenger compartment by a higher air blowing amount when the difference between the set temperature Tset and the inside air temperature Tr of the passenger compartment is large during a cooling operation. If conditioned air of a low temperature is blown through seat 3 with a high air blowing amount in the seat air conditioning unit 4, the passenger will be cooled excessively and will feel tired and have a backache. To overcome this problem, the air blowing amount corresponding to air temperature is determined through experiments using thermal sensation level Sseat as a criterion. Thus, in the first embodiment, conditioned air having a lower temperature is supplied to the seat 3 by a lower air blowing amount in the steady state.

Similarly, in the air conditioning control of the space air conditioning unit 21, air having a higher temperature is blown into the passenger compartment by a higher air blowing amount when the difference between the set temperature Tset and the inside air temperature Tr of the passenger compartment is large during a heating operation. If conditioned air having a high temperature is blown by a high flow rate in the seat air conditioning unit 4, the passenger's face will be flushed by excessive heating. To overcome this problem, the air blowing amount of the seat air conditioning unit 4, corresponding to air temperature is determined through experiments using thermal sensation level $S_{seat}$. Thus, in the seat air conditioning unit 4, conditioned air having a higher temperature is supplied by a lower air blowing amount to avoid giving uncomfortable feeling to the passenger.

The air temperature and the air blowing amount set by the first seat air conditioning control are different from those set by the second seat air conditioning control. In a state immediately after the change of the air conditioning state of the passenger compartment from the transition state to the steady state, the change control (air-conditioning switching control) at step S153 where the air blowing amount (flow rate) is changed to a predetermined level stepwise is performed, and thereafter, the first seat air conditioning control is performed at step S154. Thus, the state change of the air conditioning operation can be naturally performed without giving an uncomfortable feeling to a passenger.

When the thermal load of the space air conditioning unit 21 are larger, the first seat air conditioning control is performed for preventing the super-cooling and the super heating of a passenger on the seat 3. However, when the air temperature blown from the seat 3 is still lower or higher even when the first seat air conditioning control is performed, inside air introduction control is performed at step S155 in the seat air conditioning unit 4 to open the inside air control door 43 so that the inside air is mixed to the conditioned air from the space air conditioning unit 21. Accordingly, excessive cooling and excessive heating can be prevented, and the pleasant performance of the passenger compartment can be improved.

In the first seat air conditioning control, excessive cooling can be prevented by adjusting the inside air control door 43 so as to take in the inside air when the seat target air temperature TAOseat is not higher than a predetermined temperature of, for example, about 20° C. It is preferable to prevent the passenger from feeling uncomfortable due to excessive cooling. On the other hand, when the set temperature $T_1$set is low and the passenger compartment is slightly cool, the seat blower 41 can be stopped to stop blowing conditioned air through the seat 3.

In the first embodiment, the determination of whether the air condition of the passenger compartment is in a transition state or in a steady state can be readily made by the space air condition discriminating expression: $\Sigma = |\text{Tset} - \text{Tr}| \leq \delta$ through experiments. Accordingly, is can prevent seat from being excessively heated or excessively cooled. That is, in the first embodiment, the excessive cooling and excessive heating of the seat can be prevented and satisfactory seat air conditioning can be achieved by determining whether or not the inside air temperature Tr is stable.

A first modification for determining the space air conditioning state (Step S150) will be now described. In the first modification, the unit of the temperature is "° C.", and is not indicated.

In the first embodiment, it is determined whether or not the air conditioning state of the passenger compartment is in the transition state or in the steady state by using the space air condition determination formula: $\Sigma = |\text{Tset} - \text{Tr}| \leq \delta$ using the difference $\Sigma = |\text{Tset} - \text{Tr}|$ calculated by the ECU 37 at step S150. However, the space air conditioning state can be determined by the following space air conditioning discrimination formula (3) using the difference between the set temperature Tset and the inside air temperature Tr calculated by the ECU 37, and the seat set temperature Sset.

$$\Sigma = |(Tset + Sset) - Tr| \leq \delta \qquad (3)$$

To eliminate the effect of the variation of the inside air temperature Tr on space air condition determination, the difference $\Sigma = (Tset + Sset) - Tr|$ may be calculated every four seconds for two minutes (n times) and the mean of the calculated differences may be used as $\Sigma = |(Tset + Sset) - Tr|$ for comparison with the predetermined value $\delta$. It is determined that the space air conditioning state is in a transition state when $\Sigma > \delta$. It is determined that the space air condition is in a steady state when $\Sigma \leq \delta$. The predetermined value $\delta$ is an optional vale determined through experiments conducted to determine whether the seat air conditioning operation is in an excessive cooling mode or in a excessive heating mode when the inside air temperature Tr is stable.

The space air condition discrimination will be explained. When the space air conditioning unit 21 is operating in the cooling mode and the air conditioning state of the passenger compartment is in a transition state, the inside air temperature Tr is high and the space air condition discrimination formula is not satisfied. For example, to simplify calculation, suppose that n=4, $\delta$=20, Tset=25, Sset=0 and Tr=32. Then, $\Sigma$=28 and $\Sigma > \delta$. Therefore, it is determined that the space air conditioning state is in the transition state and the second seat air conditioning control in the transition state is performed by the seat air conditioning unit 4 to cool the passenger.

When the inside air temperature Tr decreases to 30, i.e., Tr=30, $\Sigma$=20 and $\Sigma \leq \delta$. Therefore, it is determined that the space air conditioning state is in the steady state. Then, steps S152 and S153 are executed, the first seat air conditioning control in the steady state is executed by the seat air conditioning unit 4 at step S154, and the inside air introduction control is executed at step S155 to avoid excessive cooling.

When the passenger seated on the seat 3 operates the seat temperature setting switch 55 to adjust the seat set temperature Sset to, for example, "2" in the warm zone 55b, it is determined that the air conditioning state is in the steady state and the first seat air conditioning control is executed when the inside air temperature Tr drops below 32. Since the first seat air conditioning control for the steady state is started while the seat supply air temperature is high, a seat air conditioning operation suitable for a passenger who likes air conditioning on the warm side can be carried out.

When the passenger seated on the seat 3 operates the seat temperature setting switch 55 to adjust the seat set temperature Sset to, for example, "−2", in the cool zone 55a, it is determined that the air conditioning state is in the steady state and the first seat air conditioning control is executed when the inside air temperature Tr drops below 28. Since the first seat air conditioning control for the steady state is started after the seat air temperature has been lowered, a seat air conditioning operation suitable for a passenger who likes air conditioning on the cool side can be carried out.

The inside air temperature Tr is low when the space air conditioning state is in a transition state while the air conditioning system is operating in the heating mode. Therefore, in this case, the space air conditioning discrimination formula is not satisfied. For example, when n=4, $\delta$=20, Tset=25, Sset=0 and Tr=17, $\Sigma$=30 and $\Sigma > \delta$. Therefore, it is determined that the space air condition is in the transition state and the second seat air conditioning control (step 151) is executed to warm the passenger.

As the inside air temperature Tr rises to 20, $\Sigma$=20 =$\delta$ and the space air conditioning determination formula (3) is satisfied. Therefore, it is determined that the space air condition is in the steady state, steps S152 and S153 are executed, the first seat air conditioning control is executed at step S154 and the inside air introduction control is executed at step S155 to avoid excessive heating.

When the passenger seated on the seat 3 operates the seat temperature setting switch 55 to adjust the seat set temperature Sset to, for example, "2" in the warm zone 55b, it is determined that the air conditioning state is in the steady state and the first seat air conditioning control is executed when the inside air temperature Tr rises beyond 22. Since the first seat air conditioning control for the steady state is started while the seat supply air temperature is high, a seat air conditioning operation suitable for a passenger who likes air conditioning on the warm side can be carried out.

When the passenger seated on the seat 3 operates the seat temperature setting switch 55 to adjust the seat set temperature Sset to, for example, "−2" in the cool zone 55a, it is determined that the air conditioning state is in the steady state and the first seat air conditioning control is executed when the inside air temperature Tr reduces beyond 18. Since the first seat air conditioning control for the steady state is started while the seat supply air temperature is slightly low, a seat air conditioning operation suitable for a passenger who likes air conditioning on the cool side can be carried out.

The air condition determining method uses the space air condition discriminating expression: $\Sigma=|\text{Tset}-\text{Tr}|\leq\delta$ (formula (3)) using the set temperature Tset, the inside air temperature Tr and the seat set temperature $S_{set}$ as parameters. Since the seat air conditioning is a contact air conditioning and hence the thermal sensation of seat air conditioning is greatly dependent on personal preference. The air conditioning system is capable of controlling seat air conditioning so as to meet the personal preference on the warm side or on the cool side of the passenger.

A second modification for determining the space air condition state (step S150) will be now described. In the second modification, the unit of the temperature is "°C.", and is not indicated.

The foregoing embodiment uses the space air condition discriminating expression: $\Sigma=|\text{Tset}-\text{Tr}|\leq\delta$ in which the value $\delta$ is a fixed value. The value $\delta$ may be a variable value corresponding to the seat set temperature Sset.

When the seat set temperature Sset is adjusted to, for example, "2" in the warm zone 55b during a cooling operation, seat air conditioning suitable for a passenger who likes air conditioning on the warm side can be carried out. For example, when n=4, $\delta$=20 and Tset=25, the space air conditioning determination expression is satisfied and it is determined that the air condition is in the steady state and the first seat air conditioning control is executed when Tr drops below 30. If the value $\delta$ is changed from 20 to 28, it is determined that the air condition is in the steady state and the first seat air conditioning control is executed when the inside air temperature Tr drops below 32. Consequently, the first seat air conditioning control can be started while the seat supply air temperature is higher and hence seat air conditioning suitable for a passenger who likes seat air conditioning on the warm side can be carried out.

When the seat set temperature Sset is adjusted to, for example, "−2" in the cool zone 55a, seat air conditioning suitable for a passenger who likes air conditioning on the cool side can be carried out by changing the value $\delta$. For example, If the value $\delta$ is changed from 20 to 12, it is determined that the air condition state is in the steady state and the first seat air conditioning control is executed when the inside air temperature Tr drops below 28. Consequently, the first seat air conditioning control can be started after the seat supply air temperature has dropped to a lower temperature and hence seat air conditioning suitable for a passenger who likes seat air conditioning on the cool side can be carried out.

When the seat set temperature Sset is adjusted to, for example, "2" in the warm zone 55b during a heating operation, seat air conditioning suitable for a passenger who likes air conditioning on the warm side can be carried out by changing the value $\delta$. For example, when n=4, $\delta$=20, Tset=25, it is determined that the air conditioning state is in the steady state and the first seat air conditioning control is executed when the inside air temperature Tr rises beyond 20. If the value $\delta$ is changed from 20 to 12, it is determined that the air conditioning state is in the steady state and the first air seat conditioning control is executed when the inside air temperature Tr rises beyond 22. Consequently, the first seat air conditioning control can be started while the seat supply air temperature is higher and hence seat air conditioning suitable for a passenger who likes seat air conditioning on the warm side can be carried out.

When the seat set temperature Sset is adjusted to, for example, "−2", in the cool zone 55a, seat air conditioning suitable for a passenger who likes air conditioning on the cool side can be carried out by changing the value $\delta$. For example, if the value $\delta$ is changed from 20 to 28, it is determined that the air conditioning is in the steady state and the first seat air conditioning control is executed when the inside air temperature Tr rises beyond 18. Consequently, the first seat air conditioning control can be started while the seat supply air temperature is low and hence seat air conditioning suitable for a passenger who likes seat air conditioning on the cool side can be carried out.

Thus, this air conditioning determination method in the second modification, similarly to the air conditioning determination method in the first modification, enables air conditioning control meeting the personal preference on the warm side or on the cool side by properly changing the value $\delta$.

More comfortable air conditioning in a wider range of preference from a preference to the warm side to a preference to the cool side can be achieved by using the space air condition determination expression: $\Sigma=|(\text{Tset}+\text{Sset})-\text{Tr}|\leq\delta$ used by the air conditioning determination method in the first modification and by changing the value $\delta$ according to the change of the seat set temperature Sset.

A third modification of the air conditioning determination (step S150) will be now described. In the third modification, the unit of the temperature is "° C.", and is not indicated.

When the air conditioning discrimination expression: $\Sigma=|(\text{Tset}+\text{Sset})-\text{Tr}|\leq\delta$ is used, the change of the set temperature Tset and the change of the seat set temperature Sset cannot be discriminated from each other. Accordingly, conditioned air having a temperature lower than a target temperature may be blown through the seat 3 when the set temperature Tset is adjusted to a lower temperature. The value $\delta$ may be changed when only the set temperature Tset is changed to avoid blowing conditioned air of a temperature below a fixed temperature through the seat 3.

For example, when n=4, $\delta$=20, Tset=25 and Sset =0, and only the set temperature Tset is changed from 25 to 27, it is determined that seat air conditioning state is in the steady state if the inside air temperature Tr is below 32. However, since the seat set temperature Sset is not changed and hence the seat air conditioning operation is uncomfortable to a passenger who likes air conditioning on the cool side. When only the set temperature Tset is changed, the value $\delta$ is changed from 20 to 12 so that a determination that the air conditioning state is in the steady state may not be made until the inside air temperature Tr drops below 30 to carry out air conditioning suitable for a passenger who likes seat air conditioning on the cool side.

When only the set temperature Tset is changed from 25 to 23, it is determined that seat air conditioning state is in the steady state if the inside air temperature Tr is below 28. However, since the seat set temperature Sset is not changed and hence the seat air condition is uncomfortable to a passenger who likes air conditioning on the warm side. When only the set temperature Tset is changed, the value $\delta$ is changed from 20 to 28 so that a determination that the air conditioning state is in the steady state may not be made until the internal air temperature Tr drops below 30 to carry out air conditioning suitable for a passenger who likes seat air conditioning on the warm side.

Thus, this air conditioning determination method changes the value $\delta$ when only the set temperature Tset is changed. Accordingly, it is possible to execute the first seat air conditioning control without changing the determination of the seat air condition, and an uncomfortable feeling is not given to the passenger. Thus, it is possible to carry out seat air conditioning meeting the passenger's personal preference in a wide range of preference from a preference to the warm side to a preference to the cool side.

The other modifications of the first embodiment will be now described.

The vehicle air conditioning system in the foregoing embodiment performs an air conditioning operation on the basis of the result of comparison of the seat air temperature To measured by the seat air temperature sensor 47 and the seat target air temperature $TAO_{seat}$. However, the seat air temperature sensor 47 may be omitted, the seat air temperature To may be estimated on the basis of the inside air temperature Tr measured by the temperature sensor of the space air conditioning unit 21, and air conditioning control may be carried out on the basis of the estimated seat air temperature. In this case, the detection components of the space air conditioning unit 21 can be used for the air conditioning control of the seat 3.

Figure 11:
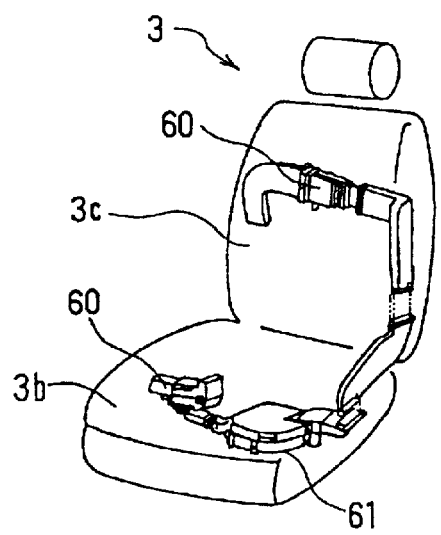
FIG. 11 is a schematic view showing heating/cooling devices provided in a seat air conditioning unit according to a modification of the first embodiment.

The vehicle air conditioning system in the foregoing embodiment supplies conditioned air, i.e., cool air or warm air, controlled by the space air conditioning unit 21 to the seat air conditioning unit 4 and blows the conditioned air through the air blowing holes 3a of the seat 3 for seat air conditioning. However, the present invention may be applied to a seat air conditioning unit provided with heating/cooling devices each provided with a Peltier device to control the temperature of seat supply air by the seat air conditioning unit. As shown in FIG. 11, heating/cooling devices 60 each provided with a Peltier device is disposed in air ducts 3d and 3e provided in the seat portion 3b and the backrest portion 3c of a seat 3, respectively. Further, a blower 61 is disposed at an upstream side of the heating/cooling devices 60 with respect to the direction of air flow, and the blower 61 is connected to the air outlet 4a of the seat air conditioning unit 4. Conditioned air, i.e., cool air or warm air, supplied by the space air conditioning unit 21 is blown through the air blowing holes 3a of the seat 3 after being heated or cooled by the heating/cooling devices 60.

When the seat air conditioning unit 4 employing the heating/cooling devices 60 is used, the ECU 37 calculates the space target air temperature TAO on the basis of the inside air temperature Tr, the outside air temperature Tam, the sunlight amount Ts and the set temperature $T_1$set, calculates the seat target air temperature $TAO_{seat}$ on the basis of the space target air temperature TAO, and controls the air blowing amount of the blower 61 and the output of the heating/cooling devices 60 in accordance with the seat target air temperature TAOseat, in a transition state or a steady state. When the ECU 37 has an additional function to control the output of the heating/cooling devices 60, the heating/cooling ability of the heating/cooling devices 60 can be used as an additional heating/cooling ability while the space air conditioning unit 21 is operating at a low output level to blow conditioned air with the space target air temperature TAO. In this case, the comfortableness of seat air conditioning operation can be further improved.

In the first embodiment, the ECU 37 determines the space air conditioning control of the space air conditioning unit 21 on the basis of the space target air temperature TAO and the space air blowing amount (space flow rate), and determines the seat air conditioning control of the seat air conditioning unit 4 on the basis of the seat target air temperature $TAO_{seat}$ and the seat air blowing amount (seat flow rate). Further, the seat target air temperature $TAO_{seat}$ is calculated by using detected values Tr, Tam and Ts of the air conditioning unit 21 and input signals from the temperature setting switch 53. However, the seat target air temperature $TAO_{seat}$ and the seat air blowing amount (flow rate) may be determined on the basis of the measured values Tr, Tam and TS for the control of the seat air conditioning unit 4. Even in this case, the air conditioning control of the seat air conditioning unit 4 may include the first seat air conditioning control in the steady state of the passenger compartment, and the second seat air conditioning control in the transition state of the passenger compartment. Thus, the space air conditioning unit 21 for air-conditioning the passenger compartment and the seat air conditioning unit 4 of a contact air conditioning system can be respectively controlled.

In the above-described first embodiment, the set temperature $T_1$set is set by a passenger through the temperature setting switch 53, and is input into the ECU 37. Thereafter, the set temperature Tset is calculated based on the set temperature $T_1$set, the outside air temperature Tam and the sunlight amount Ts in accordance with the formula (1). However, the set temperature $T_1$set set by the passenger may be directly used as a set temperature.

Figure 12A:
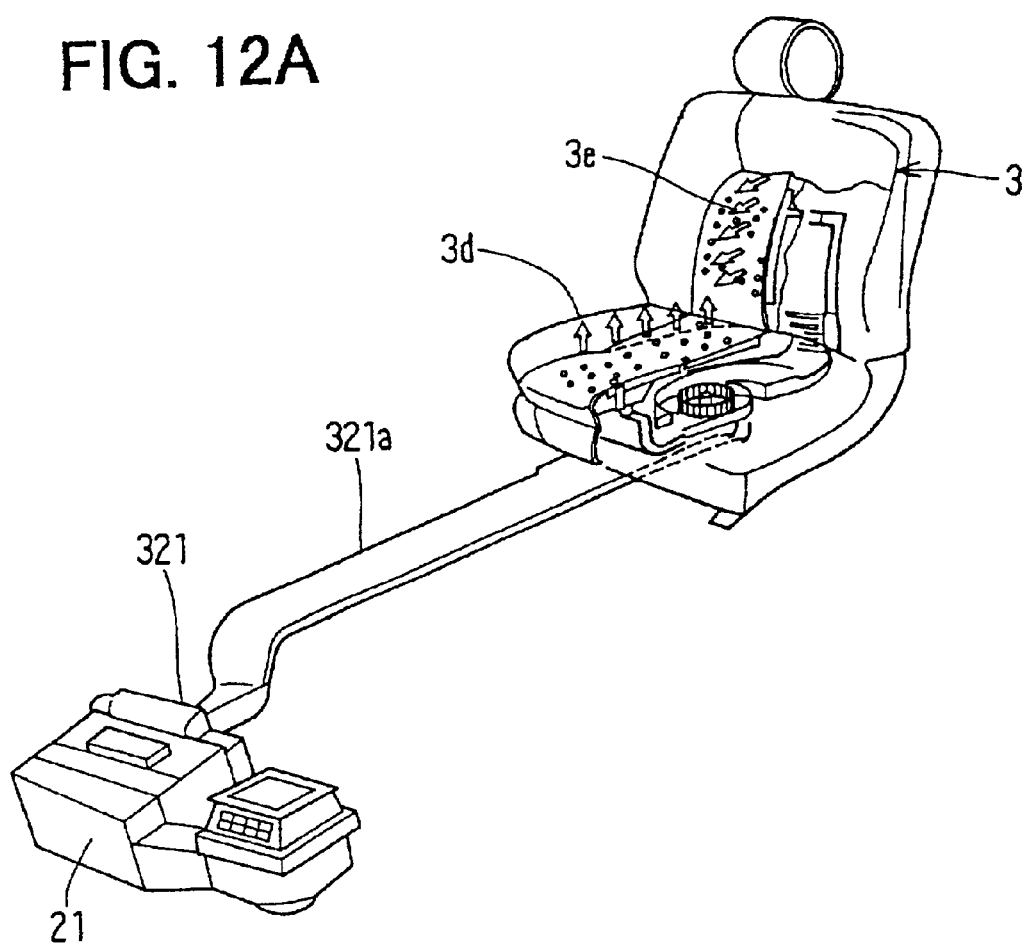
FIG. 12A is a perspective view of a seat air conditioning unit connected to a side face outlet of the space air conditioning unit.
Figure 12B:
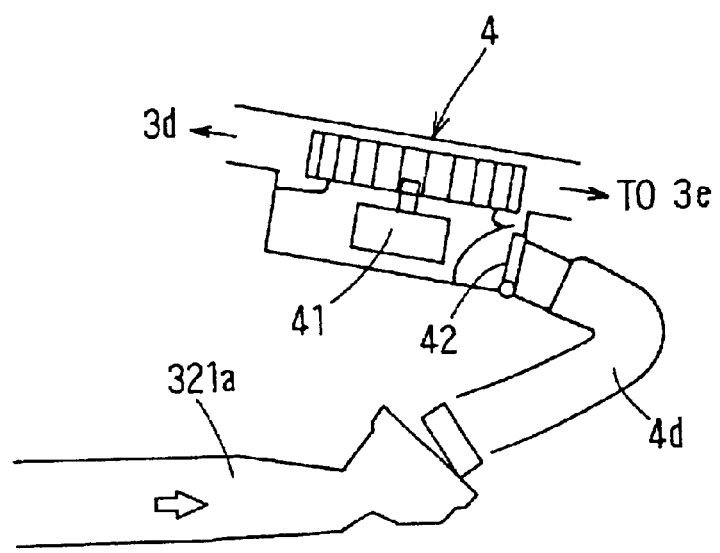
FIG. 12B is a schematic diagram showing the seat air conditioning unit, according to an another modification of the first embodiment.
Figure 13:
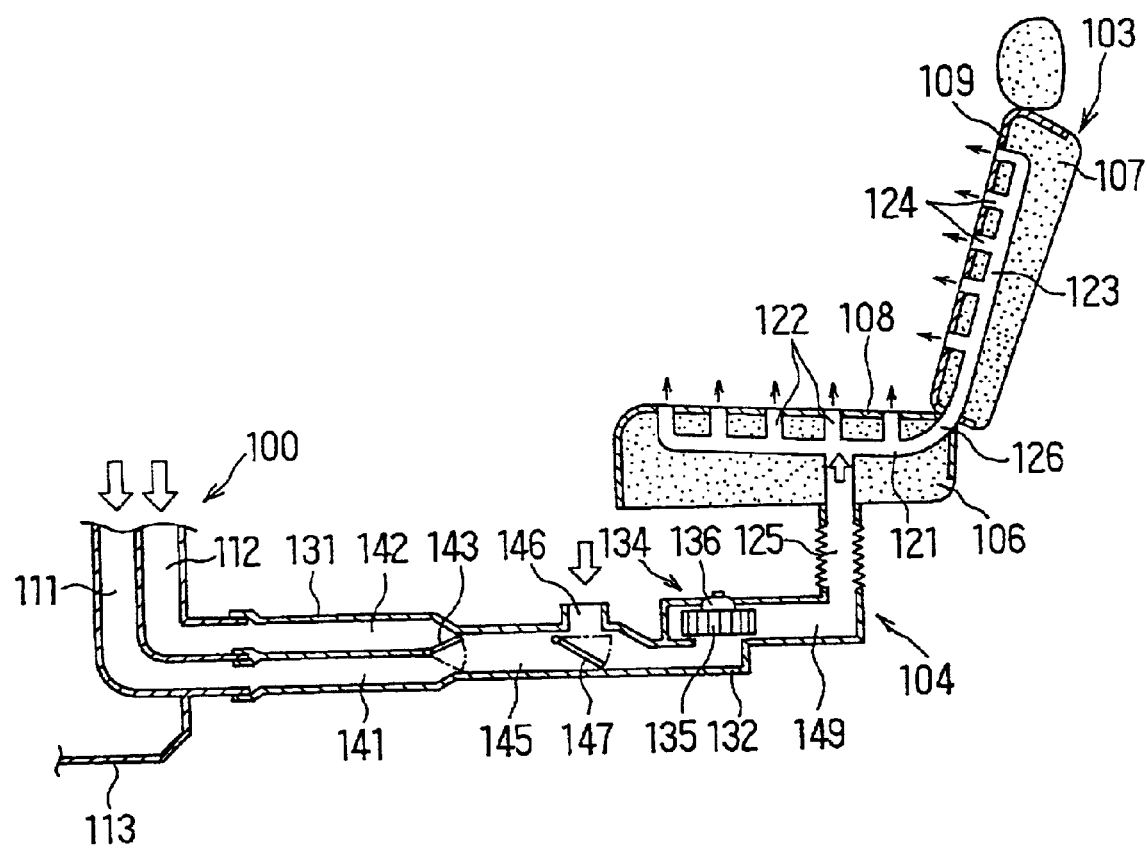
FIG. 13 is a schematic view of a vehicle air conditioning system with a seat air conditioning unit, according to a second preferred embodiment of the present invention.

In the above-described first embodiment, cool air of the space air conditioning unit 21 is supplied through the face air outlet 32 to the seat air conditioning unit 4, and the warm air is supplied through the foot air outlet 33 to the seat air conditioning unit 4. However, conditioned air of the space air conditioning unit 21 may be supplied through ducts connected to side face openings to the seat air conditioning unit 4. For example, as shown in FIGS. 12A and 12B, space air conditioning unit 21 has side face outlets 321 through which conditioned air is blown toward the passengers upper body or toward a side windshield of the vehicle. In this case, one of the side face outlets 321 is connected to the seat air conditioning unit 4 by a duct 321a to supply conditioned air of the space air conditioning unit to the seat air conditioning unit 4. The side face outlets 321 are provided in the space air conditioning unit 21 so that conditioned air is supplied always through the side face outlets 321 regardless of air outlet mode. When conditioned air of the space air conditioning unit 21 is supplied through the side face outlets 321 into the seat air conditioning unit 4, only the single air temperature control door 42 and the single duct 321a are necessary for mixing cool air and warm air, and hence the number of components of the air conditioning system can be reduced.

A second preferred embodiment of the present invention will be now described with reference to FIGS. 13–22. In the second embodiment, a space air conditioning unit 100 can be applied to a vehicle having an engine for vehicle travelling or an electrical motor for vehicle travelling. The space air conditioning unit 100 is controlled by a space air-conditioning control unit (hereinafter, referred to as "space ECU") 102 so that a temperature of a passenger compartment can be maintained at a set temperature.

A seat air conditioning unit 104 is disposed under a front seat 103, for example, so that conditioned air of the space air conditioning unit 100 is introduced into the seat air conditioning unit 104. Components of the seat air conditioning unit 104 are controlled by a seat air-conditioning control unit (hereinafter, referred to as "seat ECU") 105 so that a thermal sensation feeling (level) of a seat surface of the front seat 103 can be always maintained at a desired thermal sensation feeling of a passenger.

The space air conditioning unit 101 performs an air conditioning operation (e.g., cooling, heating) of the passenger compartment of the vehicle. The space air conditioning unit 100 has an air conditioning case 113. The air conditioning case 113 is provided to define a cool air passage 111 communicating with a face air outlet, and a warm air passage 112 communicating with a foot air outlet.

A blower 114 for generating an air flow toward the passenger compartment is provided in the air conditioning case 113. Further, a cooling heat exchanger (not shown) for cooling air blown by the blower 114 and a heating heat exchanger (not shown) for heating air blown by the blower 114 are disposed in the air conditioning case 113. For example, the cooling heat exchanger is an evaporator for cooling air using a rotation power of the vehicle engine. Further, the heating heat exchanger is a heater core for heating air using engine-cooling water as a heating source.

Figure 14:
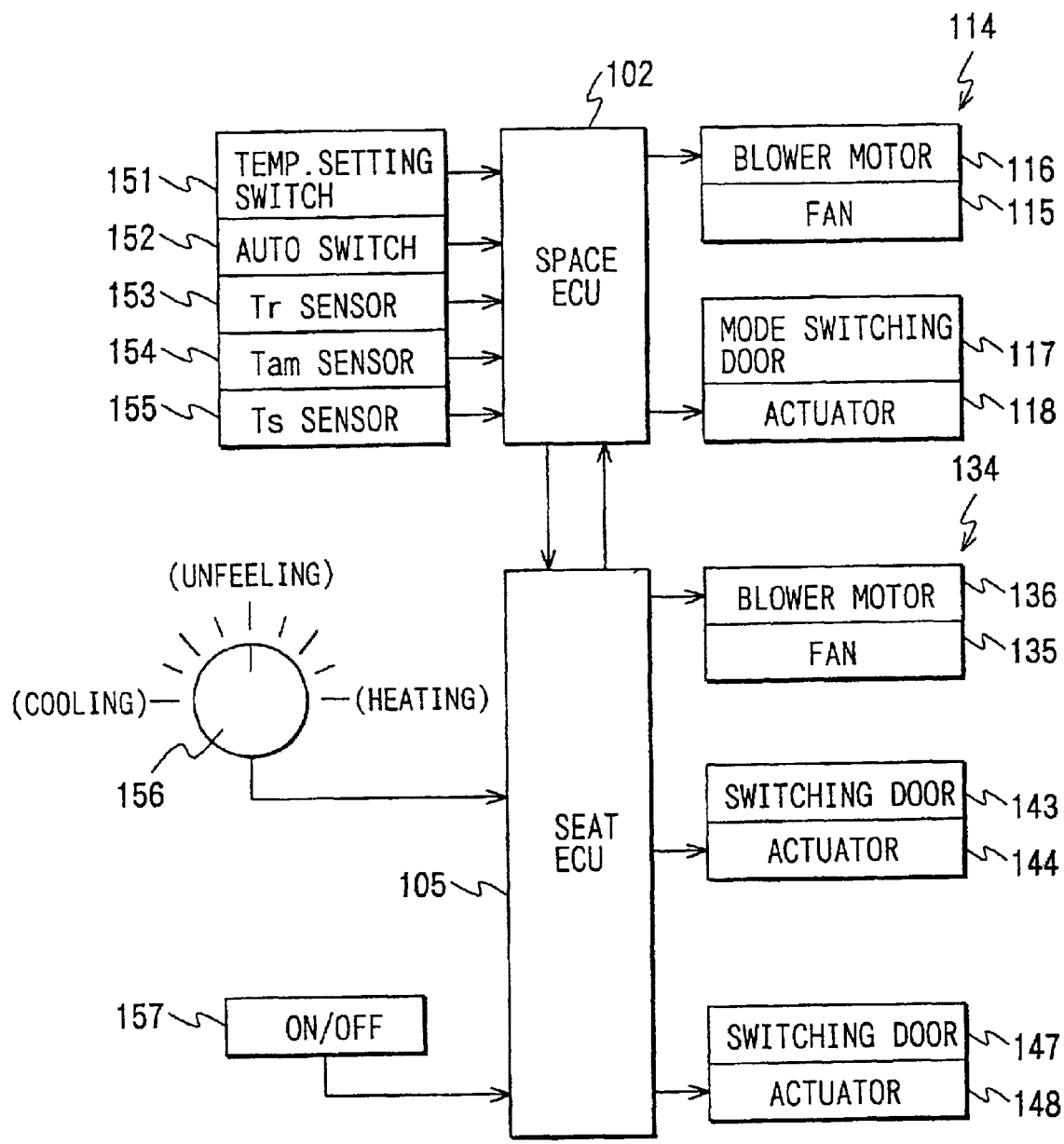
FIG. 14 is a block diagram showing a space ECU and a seat ECU of the vehicle air conditioning system according to the second embodiment.
Figure 15:
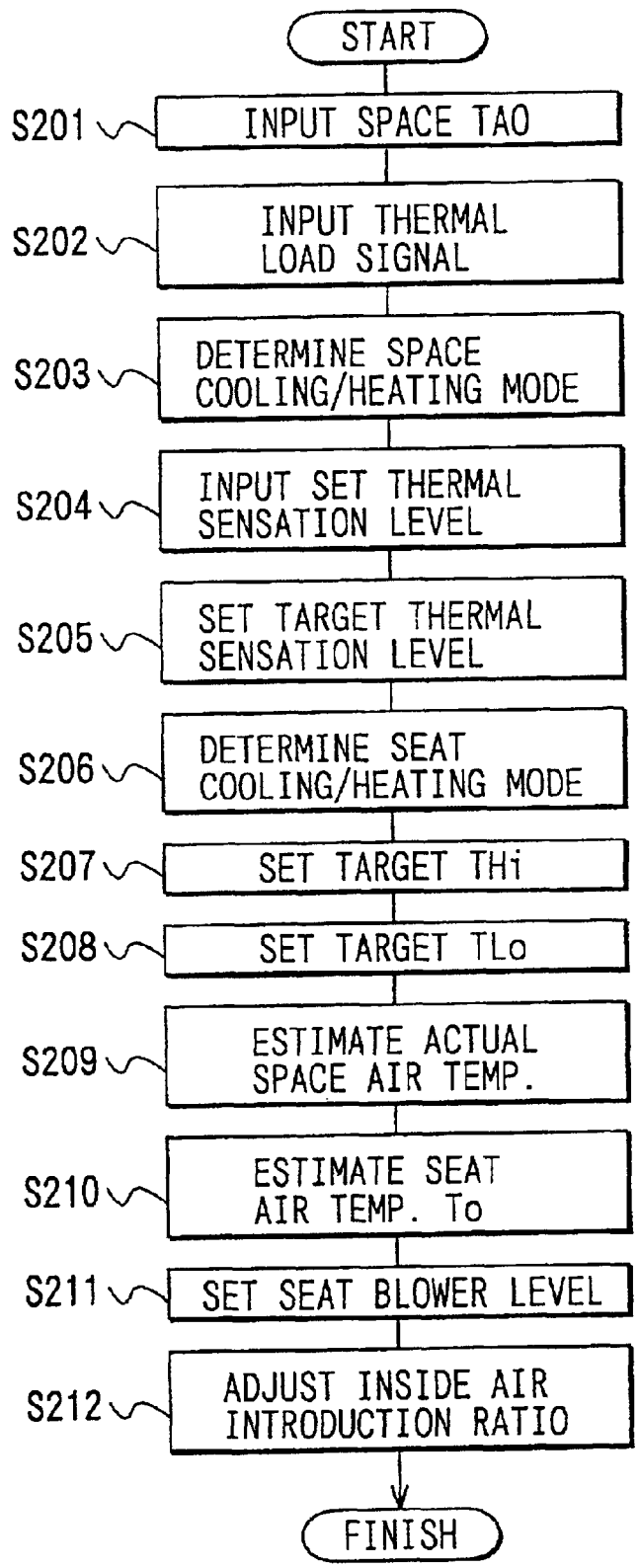
FIG. 15 is a flow diagram showing a control program of the seat ECU according to the second embodiment.

As shown in FIG. 14, the blower 114 includes a centrifugal fan 115 for blowing air, and a blower motor 116 rotating and driving the centrifugal fan 115. Accordingly, the blower 114 forcedly blows air sucked from an inside air introduction port or an outside air introduction port into the passenger compartment. An air blowing amount (rotation speed) of the centrifugal fan 115 is controlled based on a blower control voltage applied to a blower driving circuit (not shown) of the blower 116. In the second embodiment, when a blower level of the blower 116 is a high level, the air blowing amount is 560 m$^3$/h, for example. On the other hand, when a blower level of the blower 116 is a low level, the air blowing amount is 250 m$^3$/h, for example.

At a downstream air side of the air conditioning case 113 of the space air conditioning unit 100, a defroster outlet, a face outlet and a foot outlet are provided so that conditioning air is introduced into the passenger compartment through at least one outlet. A mode switching door 117 is disposed to selectively open and close the defroster outlet, the face outlet and the foot outlet, to set a face mode where only the face outlet is opened, a bi-level mode where both the face outlet and the foot outlet are opened, a foot mode where only the foot outlet is opened, a foot/defroster mode where both the foot outlet and the defroster outlet are opened, and a defroster mode where the defroster outlet is opened.

The front seat 103 is a driver's seat on which a driver is seated, or a front passenger's seat next to the driver's seat, on which a front passenger is seated. The front seat 103 includes a seat portion 106 and a backrest portion 107, and the seat portion 106 and the backrest portion 107 are covered by seat surfaces 108, 109 having an air ventilation performance, respectively.

A seat air passage 121 is provided in the seat portion 106 to communicate with a downstream air side of the seat air conditioning unit 104. Plural air blowing holes 122 are provided to be branched from the seat air passage 121 and to extend to the surface of the seat portion 106. On the other hand, a seat air passage 123 is provided in the backrest portion 107 to communicate with the downstream air side of the seat air conditioning unit 104. Plural air blowing holes 124 are provided to be branched from the seat air passage 123 and to extend to the surface of the backrest portion 107. Accordingly, conditioned air supplied from the seat air conditioning unit 104 is introduced into the air blowing holes 122, 124 through the seat air passages 121, 123, and is blown toward the hip portion and the back portion of a passenger seated on the front seat 103 from the plural air blowing holes 122, 124 through the seat surfaces 108, 109.

A communication passage 125 is provided to communicate with a downstream air side of the seat air conditioning unit 104 at an upstream air side of the seat air passage 121. Further, a communication passage 126 communicating with a downstream air side of the seat air passage 121 is provided at an upstream air side of the seat air passage 123. In the second embodiment, the seat air conditioning unit 104 is not provided for a rear seat of the passenger compartment.

The seat air conditioning unit 104 includes a seat air duct 131 connected to a downstream air side of the air conditioning case 113 of the space air conditioning unit 100, a seat air conditioning case 132 connected to a downstream air side of the seat air duct 131, and a seat blower 134 disposed in the seat air conditioning case 132.

In the second embodiment, the seat air duct 131 is disposed along a floorboard of the vehicle, for example. The seat air duct 131 is provided with a cool air passage 141 communicating with the cool air passage 111 of the space air conditioning unit 100, a warm air passage 142 communicating with the warm air passage 112, and a switching door 143 for adjusting an opening degree ratio between the cool air passage 141 and the warm air passage 142. The switching door 143 is driven by an actuator 144 (see FIG. 14) such as a servomotor.

The seat air conditioning case 132 is provided with a conditioned air suction port 145 through which conditioned air from the space air conditioning unit 100 is introduced, an inside air suction port 146 for introducing inside air from the passenger compartment, and a switching door 147 for adjusting an opening degree ratio between the conditioned air suction port 145 and an inside air suction port 146. The switching door 147 is driven by an actuator 148 (see FIG. 14) such as a servomotor. The seat air conditioning case 132 defines therein a seat air conditioning passage 149 through which conditioned air of the seat air conditioning unit 104 is introduced into the seat 103. In the second embodiment, a seat air passage for the seat air conditioning unit 104 is constructed by the seat air passages 121, 123, the communication passages 125, 126, the cool air passage 141, the warm air passage 142 and the seat air conditioning passage 149.

The seat blower 134 includes a centrifugal fan 135 generating an air flow toward the front seat 103 in the seat air conditioning case 132, and a blower motor 136 driving the centrifugal fan 135. The seat blower 134 is disposed to forcedly blow air introduced from the conditioned air suction port 145 or/and the inside air suction port 146.

An air blowing amount (rotation speed) of the centrifugal fan 135 is controlled based on a blower control voltage applied to a blower driving circuit (not shown) of the blower motor 136. In the second embodiment, when a blower level of the seat blower 134 is a high level, the air blowing amount is 50 m$^3$/h. On the other hand, when a blower level of the seat blower 134 is a low level, the air blowing amount is 10 m$^3$/h.

Similarly to the space ECU 102, the seat ECU 105 has a microcomputer constructed by CPU, ROM, RAM and the like, and plural sensor signals are input into the microcomputer after being A/D converted by an input circuit.

Into the space ECU 102, switch signals from switches such as a temperature setting switch 151 and an automatic (AUTO) switch 152, and sensor signals from sensors such as an inside air temperature sensor 153, an outside air temperature sensor 154 and a sunlight amount sensor 155, are input. The inside air temperature sensor 153 is disposed to detect an inside air temperature Tr of the passenger compartment, the outside air temperature sensor 154 is disposed to detect an outside air temperature Tam, and the sunlight amount sensor 155 is disposed to detect a sunlight amount entering into the passenger compartment. The space ECU 102 calculates a space target air temperature TAO blown into the passenger compartment based on the switch signals and the sensor signals. The space ECU 102 controls a blower level applied to the blower motor 116 of the space blower 114 and the actuator 118 of the mode switching door 117, based on the calculated space target air temperature TAO.

The temperature setting switch 151 is for setting the temperature of the passenger compartment to a desired temperature. Further, the automatic switch 152 is a switch for automatically controlling the temperature of the passenger compartment and the air blowing amount blowing into the passenger compartment.

The seat ECU 105 controls a blower level applied to the blower motor 136 of the seat blower 134, the actuator 144 of the switching door 143 and the actuator 148 of the switching door 147, based on signals from the space ECU 102, and switch signals from various switches such as a seat temperature setting switch 156 and a seat air-conditioning on/off switch 157. In the second embodiment, the signals from the ECU 102 are an air outlet mode signal of the space air conditioning unit, a signal of the space target air temperature TAO, and an air blowing amount signal of the space blower 114.

The seat temperature setting switch 156 is formed into a dial like to set a thermal sensation level of the seat surface of the front seat 103. For example, both the seat temperature setting switches 156 are disposed in the front driver's seat and the front passenger's seat, respectively. The seat air-conditioning on/off switch 157 is for instructing a start or a stop of operation of the seat air conditioning unit 104.

Next, a seat air-conditioning control of the seat ECU 105 will be described.

First, the space target air temperature TAO to be blown into the passenger compartment is calculated based on the set temperature, the inside air temperature and the sunlight amount. Next, the calculated space target air temperature TAO is input into the seat ECU 105 at step S201.

At step S202, thermal load signals are input. Specifically, the set temperature of the passenger compartment from the temperature setting switch 151, the inside air temperature from the inside air temperature sensor 153, the sunlight amount from the sunlight amount sensor 155 are input through the space ECU 102, at step S202.

Next, at step S203, a space cooling/heating mode is determined based on the determination result of an air outlet mode which is set in the space ECU 102 based on the space target air temperature TAO. For example, a cooling mode is set in the face mode, an intermediate mode is set in the bi-level mode, and a heating mode is set in the foot mode, the foot/defroster mode or the defroster mode.

Figure 16:
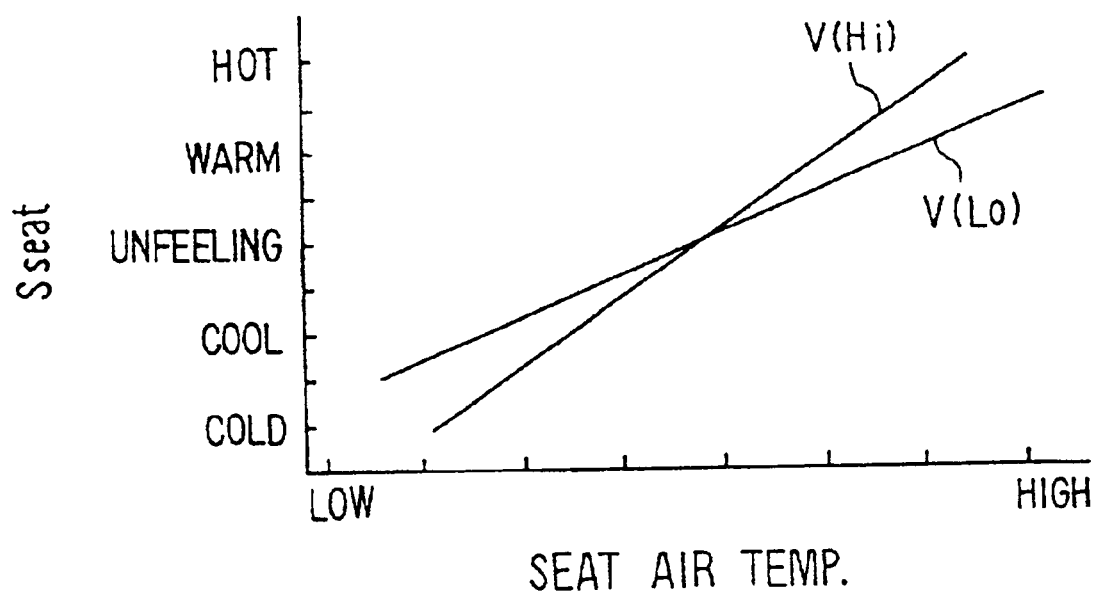
FIG. 16 is a graph showing a relationship between a seat air temperature blown into a seat passage of a vehicle seat and a thermal sensation level Sseat of a seat surface of the vehicle seat, according to the second embodiment.

At step S204, the thermal sensation level $S_{seat}$ of the seat surface of the front seat 103, set by the seat temperature setting switch 156, is input. For example, in the second embodiment, the thermal sensation level $S_{seat}$ of the seat surface can be set at a cold level, a cool level, an unfeeling level, a warm level and a hot level, as shown in FIG. 16. Next, at step S205, a target thermal sensation level is set based on the set thermal sensation level. Further, at step S206, a seat cooling/heating mode is determined. Specifically, it is determined whether the seat temperature setting switch 156 is at a cooling side or a heating side from the unfeeling state, at step S206.

At step S207, a target seat temperature THi is set when seat air blowing amount is high (e.g., 50 m³/h). Next, at step S208, a target seat temperature TLo is set when seat air blowing amount is low (e.g., 10 m³/h). Next, at step S209, an actual space air temperature to be blown into the passenger compartment is estimated based on the space target air temperature TAO input at step S201. For example, the actual temperature of conditioned air is about 7° C. at a maximum cooling operation, and the actual temperature of conditioned air is about 77° C. at a maximum heating operation.

Next, at step S210, a seat air temperature To to be introduced into the front seat 103 is estimated based on the actual space air temperature estimated at step S209 in accordance with a temperature increase degree due to a cooling load or a temperature reduce degree due to a heating load. Next, at step S211, a seat blower level of the seat blower 134 is determined based on the estimated seat air temperature To. Next, at step S212, an inside air introduction ratio mixed into conditioned air is adjusted so that air temperature to be blown into the front seat 103 is adjusted.

Figure 17:
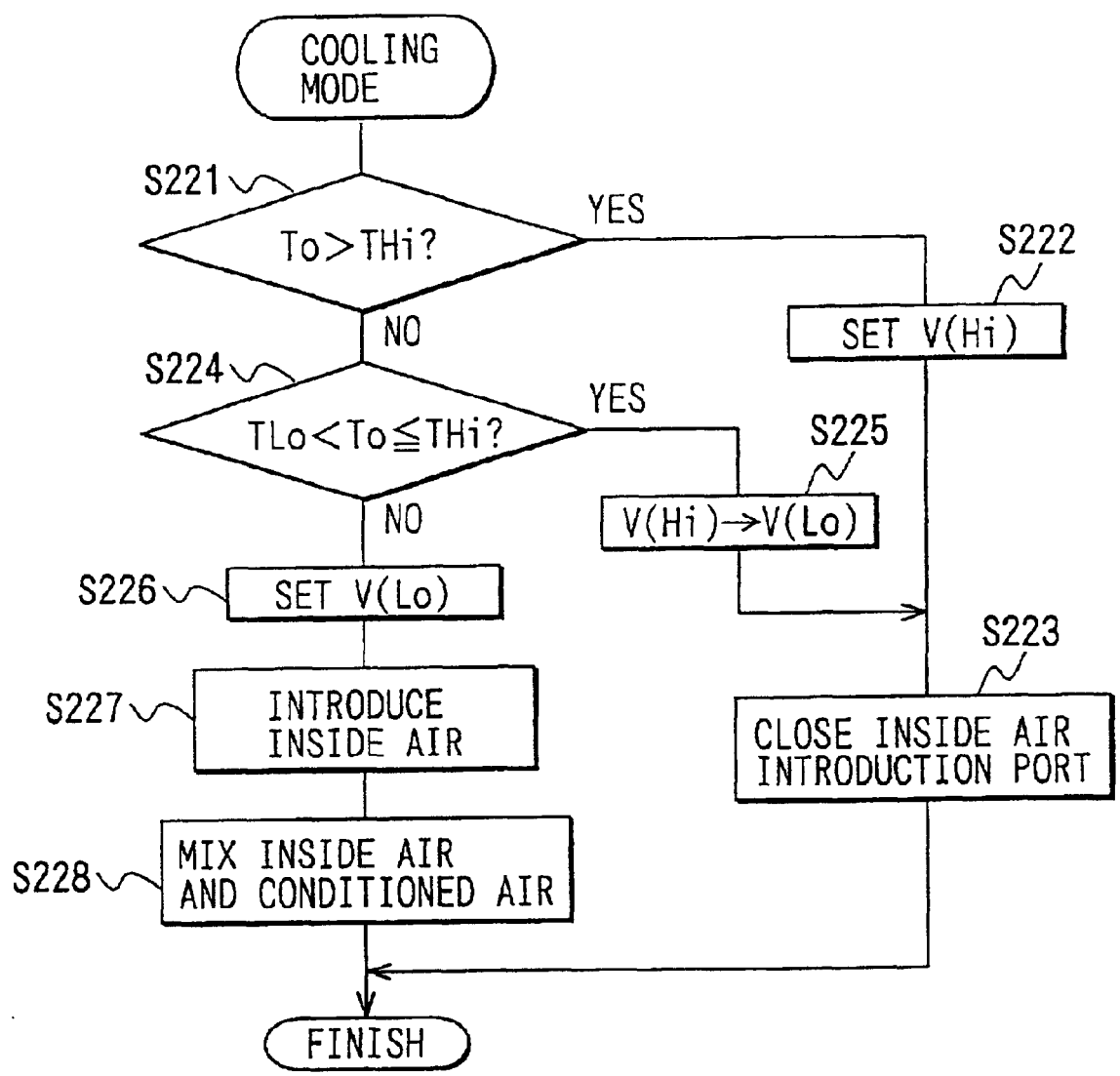
FIG. 17 is a flow diagram showing a control of a seat air temperature during a cooling mode, according to the second embodiment.

A temperature control of air flowing into the front seat 103 in the cooling mode will be now described with reference to FIG. 17. In the space cooling mode determined at step S203, when the seat cooling mode is determined at step S206, the switching door 143 fully opens the cool air passage 141 of the seat air duct 131 and fully closes the warm air passage 142. At step S221, it is determined whether or not the seat air temperature To estimated at step S210 is higher than the target seat temperature THi. When it is determined that the seat air temperature To estimated at step S210 is higher than the target seat temperature THi at step S221, the seat air blowing level of the seat blower 134 is set at a high level V(Hi) at step S222. That is, a blower level applied to the blower motor 136 of the seat blower 136 is set at a high level V(Hi).

Next, at step S223, the actuator 148 is controlled so that the switching door 147 fully opens the conditioned air suction port 145 and fully close the inside air suction port 146.

On the other hand, when it is determined that the seat air temperature To estimated at step S210 is not higher than the target seat temperature THi at step S221, it is determined whether or not the seat air temperature To is higher than the target seat temperature TLo and is equal to or lower than the target seat temperature THi (TLo<To≦THi) at step S224. When TLo<To≦THi, the seat air blowing level of the seat blower 134 is continuously stepwise reduced from the high level V(Hi) to a low level V(Lo). Next the control of step S223 is performed. When the seat air temperature To estimated at step S210 is not in a range between the target seat temperature TLo and the target seat temperature THi, the air blowing level of the seat blower 134 is set at a low level V(Lo) at step S226. That is, at step S226, the blower level applied to the blower motor 136 of the seat blower 134 is set at the low level V(Lo).

Next, at step S227, the switching door 147 is operated at a position to open both the conditioned air suction port 145 and the inside air suction port 146. Next, at step S228, inside air and conditioned air are mixed to control temperature of air flowing into the front seat 103.

Figure 18:
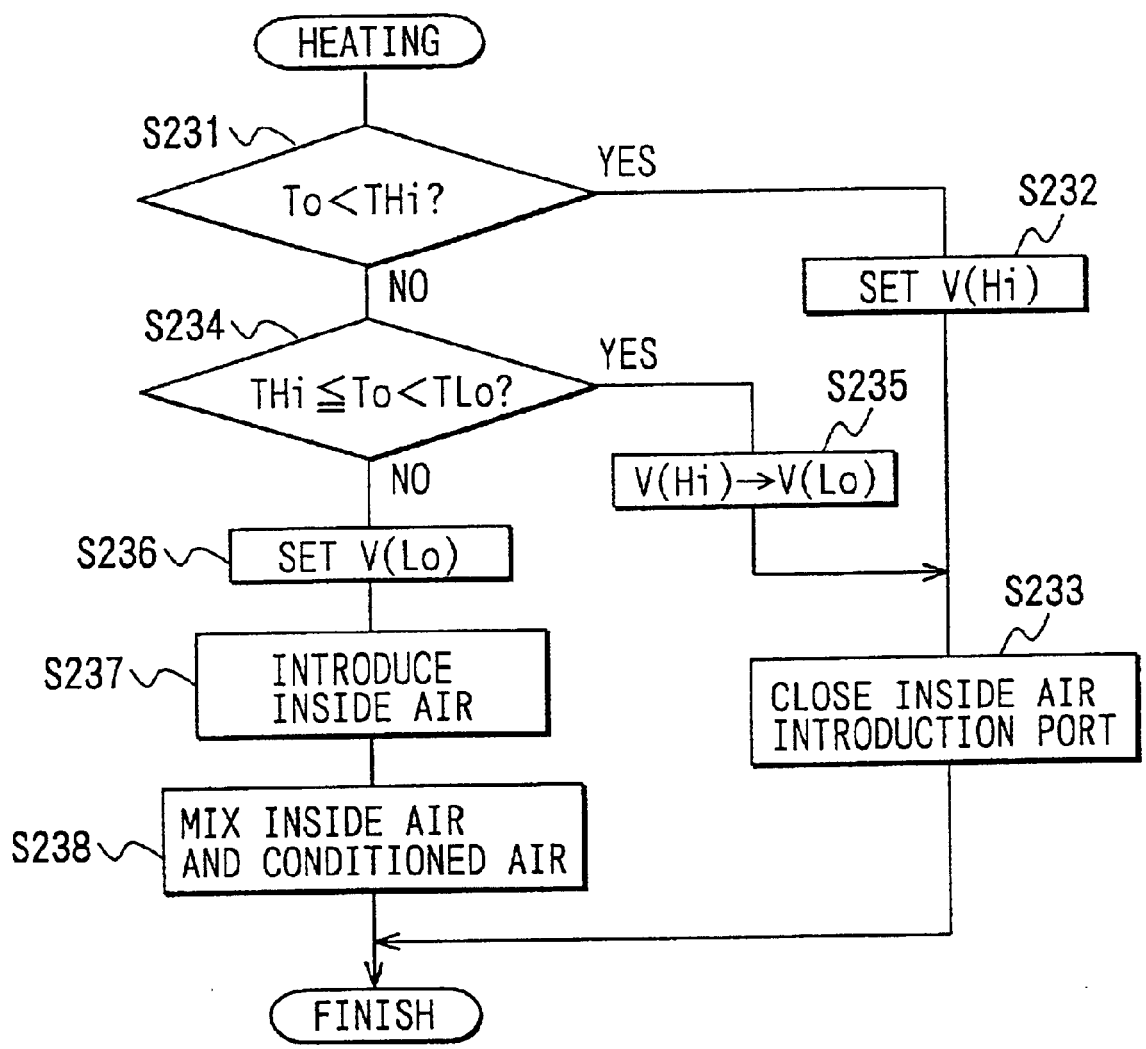
FIG. 18 is a flow diagram showing a control of the seat air temperature during a heating mode, according to the second embodiment.

A temperature control of air flowing into the front seat 103 in the heating mode will be now described with reference to FIG. 18. In the space heating mode determined at step S203, when the seat heating mode is determined at step S206, the switching door 143 fully closes the cool air passage 141 of the seat air duct 131 and fully opens the warm air passage 142. At step S231, it is determined whether or not the seat air temperature To estimated at step S210 is lower than the target seat temperature THi. When it is determined that the seat air temperature To estimated at step S210 is lower than the target seat temperature THi at step S231, the seat air blowing level of the seat blower 134 is set at a high level V(Hi) at step S232. That is, a blower level applied to the blower motor 136 of the seat blower 134 is set at a high level V(Hi).

Next, at step S233, the actuator 148 is controlled so that the switching door 147 fully opens the conditioned air suction port 145 and fully close the inside air suction port 146.

On the other hand, when it is determined that the seat air temperature To estimated at step S210 is not lower than the target seat temperature THi at step S231, it is determined whether or not the estimated seat air temperature To is lower than the target seat temperature TLo and is equal to or higher than the target seat temperature THi (TLo>To≧THi) at step S234. When TLo>To≧THi, the seat air blowing level of the seat blower 134 is continuously stepwise reduced from the high level V(Hi) to a low level V(Lo). Next the control of step S233 is performed. When the seat air temperature To estimated at step S210 is not in a range between the target seat temperature TLo and the target seat temperature THi, the air blowing level of the seat blower 134 is set at a low level V(Lo) at step S236. That is, at step S236, the blower level applied to the blower motor 136 of the seat blower 134 is set at the low level V(Lo).

Next, at step S237, the switching door 147 is operated at a position to open both the conditioned air suction port 145 and the inside air suction port 146. Next, at step S238, inside air and conditioned air are mixed to control temperature of air flowing into the front seat 103 in the heating mode.

Next, the operation of the seat air conditioning unit 104 according to the second embodiment will be now described in the space cooling mode, in the space heating mode, and in the intermediate mode.

(1) COOLING MODE

When the space cooling mode (cool-down control) of the space air conditioning unit 100 is set, when the seat air conditioning operation is turned on by the seat temperature switch 156 or the seat air-conditioning on/off switch 157, the cooling/heating mode of the front seat 103 is determined. For example, when an initial space target air temperature of the space air conditioning unit 100 is low, the space cooling mode is determined.

In the cooling mode, a part of cool air from the cool air passage 111 flows into the seat air passage 121, 123 of the front seat 103 through the cool air passage 141. At this time, the actuator 144 is operated so that the switching door 143 opens the cool air passage 141 and closes the warm air passage 142. On the other hand, the switching door 147 opens the conditioned air suction port 145 and closes the inside air suction port 146. Accordingly, cool air from the space air conditioning unit 100 is introduced to the centrifugal fan 135 of the seat blower 134 within the seat air conditioning case 132. Thus, cool air is blown by the centrifugal fan 135 into the communication passages 125, 126 and the seat air passages 121, 123, is distributed into the air blowing holes 122, 124, and is blown through the seat surfaces 108, 109 to cool a front passenger seated on the front seat 103.

At an initial time in the cool-down control of the passenger compartment, the temperature of air blown from the face outlet of the space air conditioning unit 100 is high, but is decreased as time passes. Accordingly, the blower level of the blower motor 116 of the space blower 114 is set to be reduced as time passes. However, when air conditioning load of the passenger compartment is high, the temperature of air blown into the passenger compartment is set at the maximum cool temperature, and the temperature of air flowing into the seat air passages 121, 123 of the front seat 103 is low. When this low-temperature air blowing into the front seat 103 is continued, the seat surface of the front seat 103 is super-cooled, and unpleasant cool feeling is given to the passenger seated on the front seat 103.

FIG. 16 is an experimental result showing a relationship between the seat air temperature and the thermal sensation level Sseat in a steady air-conditioning steady state.

In the second embodiment, the actual air temperature blown into the passenger compartment is estimated based on the space target air temperature TAO, and the seat air temperature To is estimated in accordance with the air conditioning load. Further, the blower level of the blower motor 136 of the seat blower 134, the actuator 144 of the switching door 143, and the actuator 148 of the switching door 147 are controlled based on the estimated seat air temperature To.

When the estimated seat air temperature To is high, the blower level of the blower motor 136 of the seat blower 134 is set at a high level so that the heat of the front seat 103 is rapidly reduced.

When the temperature of the passenger compartment is lowered and the actual temperature of conditioned air blown from the face outlet is decreased, the temperature of air supplied to the cool air passage 111 is reduced, and the temperature of air flowing into the front seat 103 is also reduced. In this case, a point A, at which the thermal sensation level becomes the cool level in a high blower level V(Hi) of the blower motor 136 of the seat blower 134, is determined based on the graph of FIG. 19. When the seat air temperature is lower than a temperature at the point A in FIG. 19, the seat blower level is reduced so that the thermal sensation level of the seat surface is maintained.

Figure 20:
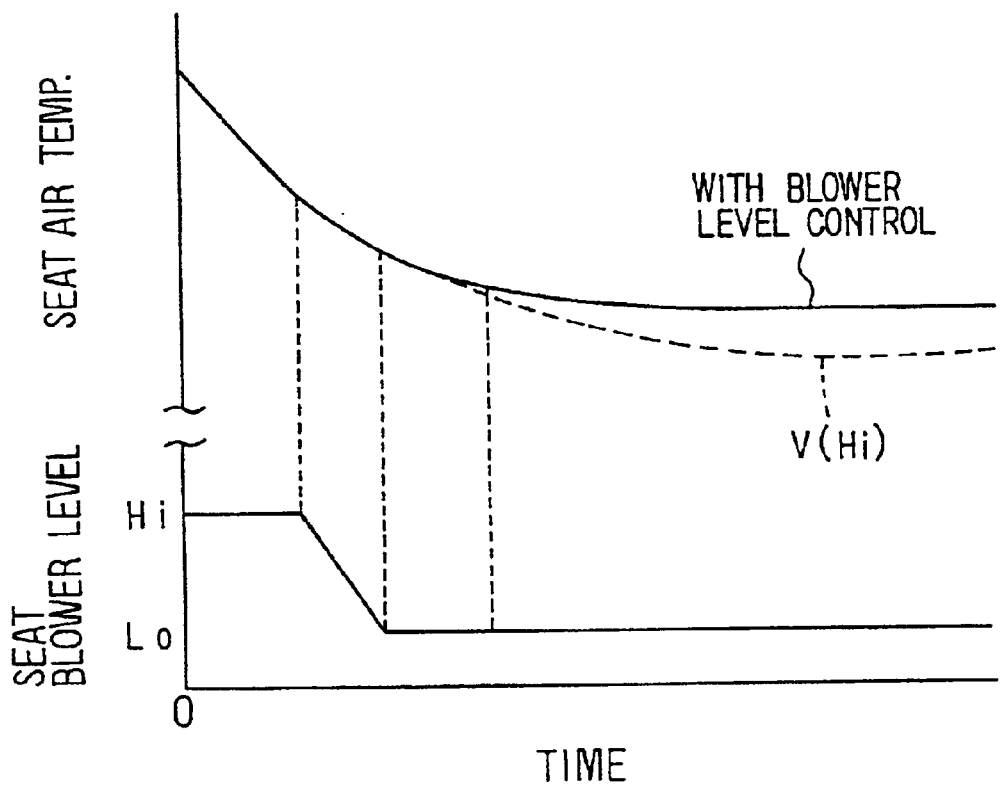
FIG. 20 is a time chart showing a change of the seat air temperature and a change of a seat blower level, during the cooling mode, according to the second embodiment.

In the cooling mode, the seat air temperature can be increased by controlling (decreasing) the seat blower level as shown in FIG. 20. FIG. 20 shows the relationship between the seat air temperature, the seat blower level and time for which the cooling mode is performed.

Figure 19:
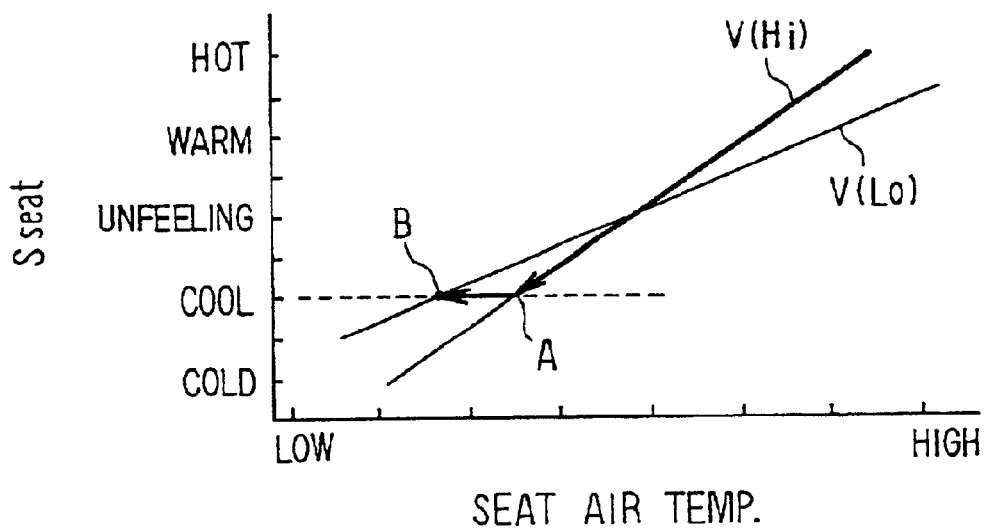
FIG. 19 is a graph showing a relationship between the seat air temperature and the thermal sensation level Sseat, for explaining a control operation of the seat air conditioning unit during the cooling mode, according to the second embodiment.

In the graph of FIG. 19 and the time flow diagram of FIG. 20, the relationships between the seat air temperature and the seat blower level at two points are indicated. However, in the second embodiment, plural relationships between the seat air temperature and the seat blower level at plural points can be set.

When the thermal sensation level becomes the cold level even when the seat blower level is set at the minimum level, the switching door 147 is operated at a position so that inside air inside the passenger compartment is mixed to the conditioned air from the space air conditioning unit 100. Accordingly, in this case, the air mixing ratio between inside air and conditioned can be adjusted by adjusting the operation position of the switching door 147, so that the seat air temperature at the point B in FIG. 19 can be maintained.

When the air mixing ratio of the inside air is increased, because the seat air temperature finally becomes about 25° C. corresponding to the inside air temperature of the passenger compartment, unpleasant feeling is not given to the passenger.

In a case where the thermal sensation level of the seat surface is controlled to be steady by the cool air and the inside air, when the temperature of conditioned air blown into the passenger compartment is further lowered due to an outside thermal load, the seat blower level or the mixing ratio of the inside air amount can be controlled so that the temperature of air flowing into the seat can be maintained at a constant temperature.

When the seat temperature switch 156 is manually operated from the unfeeling state to the cooling side, a target value of the thermal sensation level Sseat of the seat surface is shifted to the side of the cold level in accordance with a change of the set value of the thermal sensation level of the seat surface. In this case, the seat blower level is reduced as described above, and the temperature of air blowing into the front seat 103 can be controlled by mixing cool air and inside air inside the passenger compartment.

Conversely, when the seat temperature switch 156 is manually operated from the unfeeling state to the heating side, the target value of the thermal sensation level Sseat of the seat surface is shifted to the side of the warm level in accordance with a change of the set value of the thermal sensation level of the seat surface. Even in this case, the seat blower level and the seat air temperature can be controlled.

In the cooling mode, when the thermal sensation level is set at the side of the warm level, the temperature of air flowing into the front seat 103 is necessary to be higher. Accordingly, in this case, at an early time after the cool-down operation is performed, inside air is mixed into the conditioned air, so that the seat air temperature is readily controlled. Further, when the inside air temperature of the passenger compartment is low, the seat blower level is decreased so that the thermal sensation level of the seat surface can be maintained.

Thereafter, even when the seal blower level is the minimum level, when a suitable thermal sensation level for a passenger on the front seat 103 is not maintained, the blower motor 136 of the seat blower 134 is turned off to stop the rotation of the centrifugal fan 135. Accordingly, an air blowing into the seat air passage 121, 123 is stopped, and it can prevent the front seat 103 from being super-cooled. Alternatively, a PCT heater may be disposed in a seat air passage to control the seat air temperature.

(2) HEATING MODE

When the space heating mode (warm-up control) of the space air conditioning unit 100 is set, when the seat air conditioning operation is turned on by the seat temperature switch 156 or the seat air-conditioning on/off switch 157, the cooling/heating mode of the front seat 103 can be determined.

In the heating mode, a part of warm air from the warm air passage 112 flows into the seat air passage 121, 123 of the front seat 103 through the warm air passage 142. At this time, the actuator 141 is operated so that the switching door 143 closes the cool air passage 141 and opens the warm air passage 142. On the other hand, the switching door 147 opens the conditioned air suction port 145 and closes the inside air suction port 146. Accordingly, warm air from the space air conditioning unit 100 is introduced to the centrifugal fan 135 of the seat blower 134 within the seat air conditioning case 132. Thus, warm air is blown by the centrifugal fan 135 into the communication passages 125, 126 and the seat air passages 121, 123, is distributed into the air blowing holes 122, 124, and is blown through the seat surfaces 108, 109 to heat a front passenger seated on the front seat 103.

At an initial time in the warm-up control of the passenger compartment, the temperature of air blown from the foot outlet of the space air conditioning unit 100 is low, but is increased as time passes. Accordingly, the blower level of the blower motor 116 of the space blower 114 is set to be reduced as time passes. However, when air heating load of the passenger compartment is high, the temperature of air blown into the passenger compartment is set at the maximum hot temperature, and the temperature of air flowing into the seat air passages 121, 123 of the front seat 103 is high. When this high-temperature air blowing into the front seat 103 is continued, the seat surface of the front seat 103 is super-heated, and unpleasant hot feeling is given to the passenger seated on the front seat 103.

In the second embodiment, the actual air temperature blown into the passenger compartment is estimated based on the space target air temperature TAO, and the seat air temperature To is estimated in accordance with the air conditioning load. Further, the blower level of the blower motor 136 of the seat blower 134, the actuator 144 of the switching door 143, and the actuator 148 of the switching door 147 are controlled based on the estimated seat air temperature To.

When the estimated seat air temperature To is lower than a predetermined temperature, the blower level of the blower motor 136 of the seat blower 134 is set at a high level so that the front seat 103 is rapidly heated.

When the temperature of the passenger compartment is increased and the actual temperature of conditioned air blown from the foot outlet is increased, the temperature of air supplied to the warm air passage 112 is increased, and the temperature of air flowing into the front seat 103 is also increased. In this case, a point C, at which the thermal sensation level becomes the warm level in a high blower level V(Hi) of the blower motor 136 of the seat blower 134, is determined based on the graph of FIG. 21. When the seat air temperature is higher than a temperature at the point C, the seat blower level is reduced to the level of the point D in FIG. 21 so that the thermal sensation level of the seat surface is maintained. In the heating mode, the seat air temperature can be decreased by controlling (decreasing) the seat blower level as shown in FIG. 22. FIG. 22 shows the relationship between the seat air temperature, the seat blower level and time for which the heating mode is performed.

Figure 21:
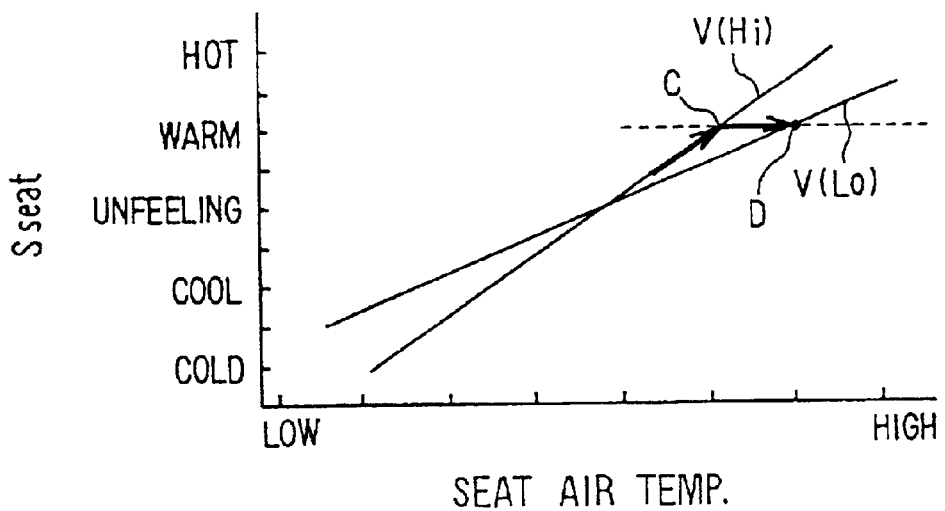
FIG. 21 is a graph showing a relationship between the seat air temperature and the thermal sensation level Sseat, for explaining a control operation of the seat air conditioning unit during the heating mode, according to the second embodiment.
Figure 22:
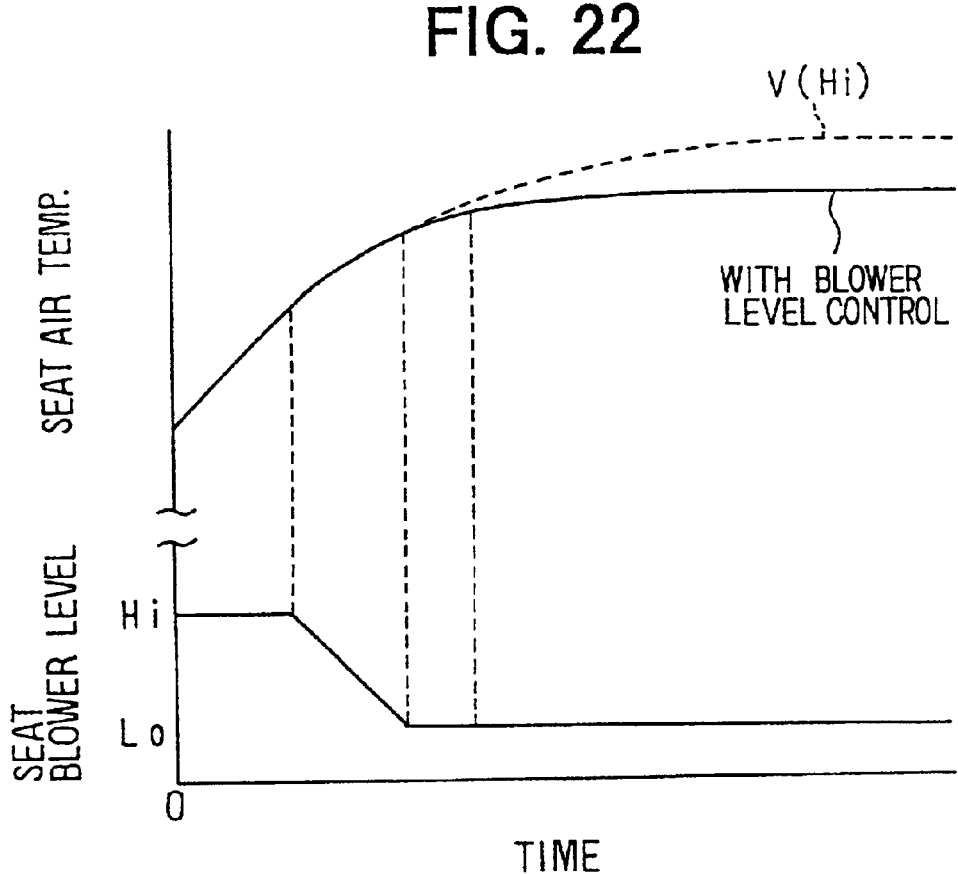
FIG. 22 is a time chart showing a change of the seat air temperature and a change of the seat blower level, during the heating mode, according to the second embodiment.

In the graph of FIG. 21 and the time flow diagram of FIG. 22, the relationships between the seat air temperature and the seat blower level at two points are indicated. However, in the second embodiment, plural relationships between the seat air temperature and the seat blower level at plural points can be set.

When the thermal sensation level becomes the hot level even when the seat blower level is set at the minimum level, the switching door 147 is operated at a position so that inside air inside the passenger compartment is mixed to the conditioned air from the space air conditioning unit 100. Accordingly, in this case, the air mixing ratio between inside air and conditioned can be adjusted by adjusting the operation position of the switching door 147, so that the seat air temperature at the point D in FIG. 21 can be maintained.

When the air mixing ratio of the inside air is increased, because the seat air temperature finally becomes about 30° C. corresponding to the inside air temperature of the passenger compartment, unpleasant feeling is not given to the passenger.

In a case where the thermal sensation level of the seat surface is controlled to be steady by the warm air and the inside air, when the temperature of conditioned air blown into the passenger compartment is further increased due to an outside thermal load, the seat blowing level or the mixing ratio of the inside air amount can be controlled so that the temperature of air flowing into the seat can be maintained at a constant temperature.

When the seat temperature switch 156 is manually operated from the unfeeling state to the heating side, a target value of the thermal sensation level Sseat of the seat surface is shifted to the side of the hot level in accordance with a change of the set value of the thermal sensation level of the seat surface. In this case, the seat blower level is reduced as described above, and the temperature of air blowing into the front seat 103 can be controlled by mixing warm air and inside air inside the passenger compartment.

Conversely, when the seat temperature switch 156 is manually operated from the unfeeling state to the cooling side, the target value of the thermal sensation level Sseat of the seat surface is shifted to the side of the cool level in accordance with a change of the set value of the thermal sensation level of the seat surface. Even in this case, the seat blower level and the seat air temperature can be controlled.

In the heating mode, when the thermal sensation level is set at the side of the cool level, the temperature of air flowing into the front seat 103 is necessary to be lower. Accordingly, in this case, at an early time after the warm-up operation is performed, inside air is mixed into the conditioned air, so that the seat air temperature is controlled. Further, when the inside air temperature of the passenger compartment is high, the seat blower level is decreased so that the thermal sensation level of the seat surface can be maintained.

Thereafter, even when the seal blower level is the minimum level, when a suitable thermal sensation level for a passenger on the front seat 103 is not maintained, the blower motor 136 of the seat blower 134 is turned off to stop the rotation of the centrifugal fan 135. Accordingly, an air blowing into the seat air passage 121, 123 is stopped, and it can prevent the front seat 103 from being super-heated. Alternatively, a cooling unit may be disposed in a seat air passage to control the seat air temperature.

(3) INTERMEDIATE MODE

When the intermediate mode is set, a part of cool air from the cool air passage 111 and a part of warm air from the warm air passage 112 flows into the seat air passage 121, 123 of the front seat 103 through the cool air passage 141 and the warm air passage 142. At this time, the actuator 144 is operated so that the switching door 143 is operated at a predetermined position.

When the bi-level mode (middle level) is set in the space air conditioning unit 100 and when the thermal sensation level is the unfeeling state, the switching door 143 is operated to open the cool air passage 141. Therefore, conditioned air is blown into the seat air passages 121, 123 of the front seat 103 through the cool air passage 111 and the cool air passage 141, similarly to the cooling mode.

Similarly to the cooling mode in the summer, when the estimated seat air temperature To becomes lower, the seat blower level is reduced, and the switching door 147 is operated to introduce inside air so that the seat air temperature is controlled. In this case, an opening ratio between the cool air passage 141 and the warm air passage 142 may be adjusted by the switching door 143 so that the seat air temperature can be readily adjusted.

When the bi-level mode (middle level) is set in the space air conditioning unit 100 and when the thermal sensation level is the heating side, the switching door 143 is operated to open the warm air passage 142. Therefore, conditioned air is blown into the seat air passages 121, 123 of the front seat 103 through the warm air passage 112 and the warm air passage 142, similarly to the heating mode.

When the temperature of conditioned air is increased, the switching door 147 is operated to introduce inside air so that the seat air temperature can controlled. In this case, the opening ratio between the cool air passage 141 and the warm air passage 142 may be adjusted by the switching door 143 so that the seat air temperature can be readily adjusted. Alternatively, in this case, only inside air can be introduced into the front seat 103.

According to the second embodiment of the present invention, the actual temperature of air blown into the passenger compartment is estimated based on the space target air temperature TAO, and the seat air temperature To is estimated based on the estimated actual space air temperature to consider a temperature increase or a temperature decrease due to an air conditioning load from the space air conditioning unit 100 to the front seat 103. Further, the seat blower level (seat air blowing amount), and an air amount mixing ratio between conditioned air from the space air conditioning unit 100 and inside air from the passenger compartment are set based on the estimated seat air temperature. Accordingly, it can prevent an unpleasant feeling such as super-cooling or super heating from being given to a passenger on the front seat 103 in which the seat air conditioning unit 104 is provided.

Further, even when a set value of the thermal sensation level of the seat surface of the front seat 103 is changed, the seat blower level and the seat temperature corresponding to the set thermal sensation level can be set without changing the air conditioning capacity of the space air conditioning unit 100. Because the air conditioning capacity of the space air conditioning unit is not changed even when the set thermal sensation level of the seat surface of the front seat 103 changes, a pleasant feeling for a passenger on a vehicle seat, where the seat air conditioning unit 104 is not provided, can be maintained.

Figure 23:
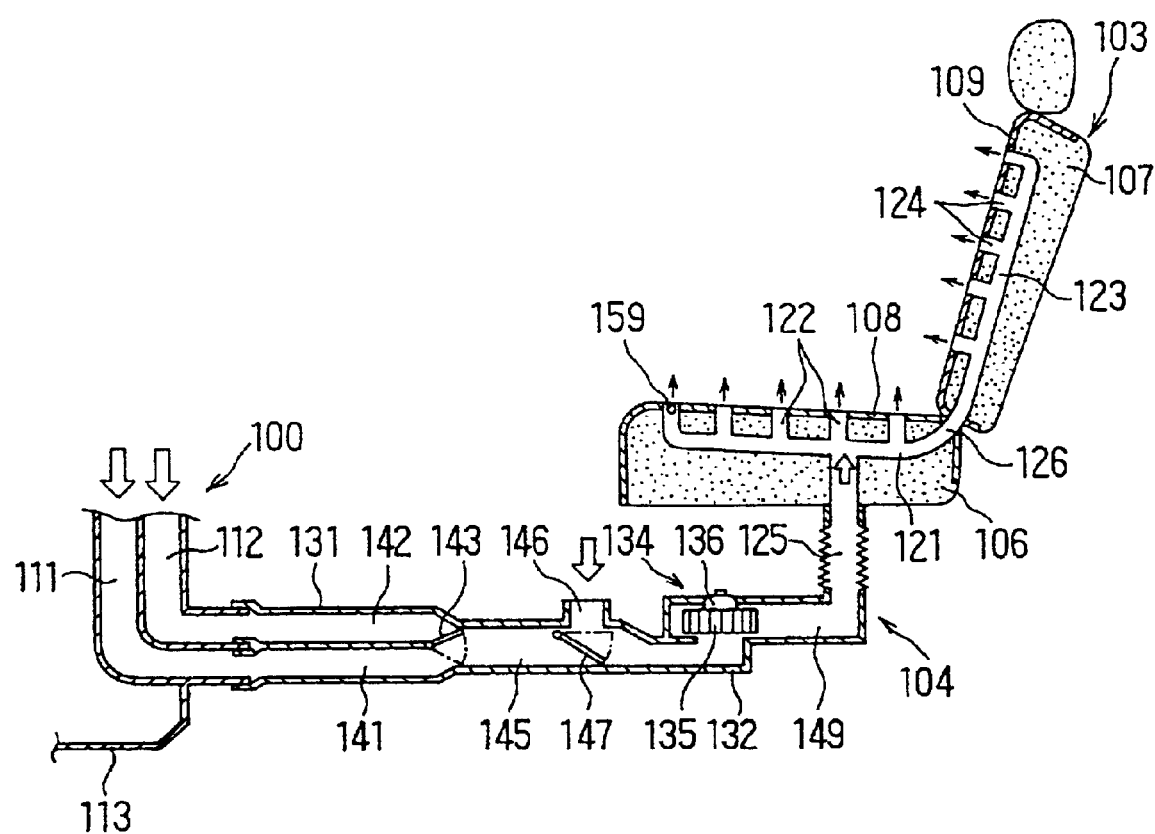
FIG. 23 is a schematic view of a vehicle air conditioning system with a seat air conditioning unit, according to a third preferred embodiment of the present invention.
Figure 24:
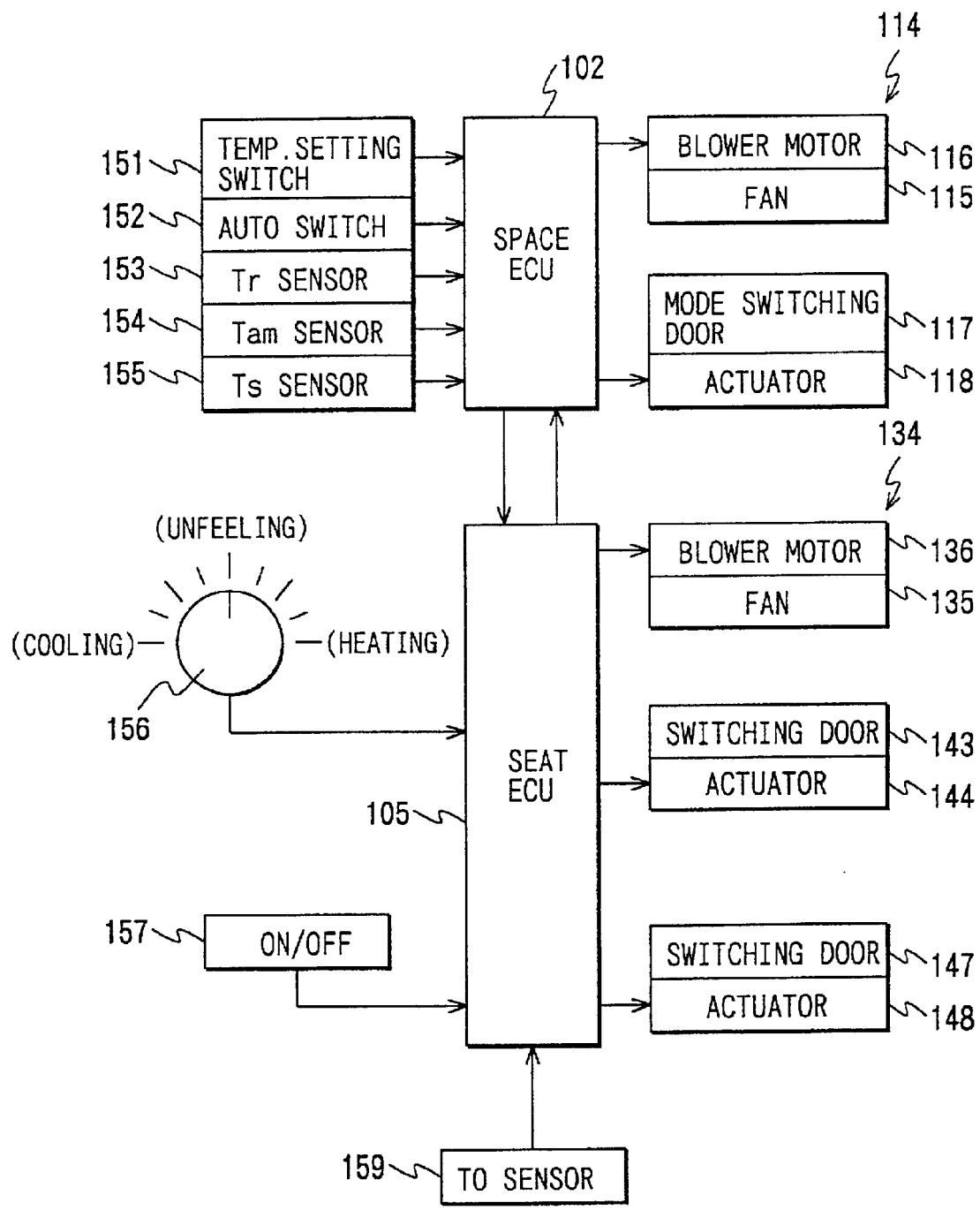
FIG. 24 is a block diagram showing a space ECU and a seat ECU of the vehicle air conditioning system according to the third embodiment.

A third preferred embodiment of the present invention will be now described with reference to FIGS. 23 and 24. In the above-described second embodiment of the present invention, the seat air temperature To is estimated from the space target air temperature TAO. In the third embodiment, a seat air temperature sensor 159 is disposed in the seat air passages 121, 123 of the front seat 103 to directly detect an actual temperature of air blown into the seat air passages 121, 123. Therefore, the temperature of air blown into the front seat 103 through the seat air passages 122, 123 can be accurately detected. In the third embodiment, the other parts are similar to those of the above-described second embodiment, and the effect similar to that of the second embodiment can be obtained.

In the above-described second and third embodiments, the present invention is applied to the vehicle air conditioning system where conditioned air from the space air conditioning unit 100 is blown into the seat air passages 122, 123 of the front seat 103; however, may be applied to a vehicle air conditioning system where only inside air is sucked into the seat air conditioning unit 104 and is cooled or heated by a heat exchanger provided in the seat air conditioning unit 104. In this case, the seat air temperature can be directly detected by a seat air temperature sensor or can be estimated based on the inside air temperature of the passenger compartment.

In the above-described second and third embodiments, the cooling/heating mode of the passenger compartment is determined based on the space target air temperature TAO. However, the cooling/heating mode of the passenger compartment may be determined based on an air outlet mode of the space air conditioning unit 100, or may be determined based on a warm-up determination or a cool-down determination of the space air conditioning unit 100.

In the above-described second and the third embodiments, the space ECU 102 calculates the space target air temperature TAO based on signals from the various sensors for detecting the air conditioning state of the passenger compartment. However, the air conditioning state of the passenger compartment may be detected only by the inside air temperature sensor 153, or may be detected by a temperature sensor provided in the face outlet or the foot outlet of the space air conditioning unit 100.

Although the present invention has been fully described in connection with the preferred embodiments thereof with reference to the accompanying drawings, it is to be noted that various changes and modifications will become appar-

What is claimed is:

1. An air conditioning system for a vehicle having a passenger compartment and a seat provided in the passenger compartment, the air conditioning system comprising:
   a space air conditioning unit which introduces conditioned air having an adjusted temperature into the passenger compartment;
   a seat air conditioning unit which introduces conditioned air into the seat on which a passenger is seated; and
   a control unit which controls the space air conditioning unit and the seat air conditioning unit, in accordance with a detection value of a thermal load of the vehicle, wherein:
   the control unit includes
      space calculation means for calculating a space target air temperature to be blown into the passenger compartment based on the detection value of the thermal load of the vehicle and a set temperature set by a passenger, and
      space controlling means for controlling the space air conditioning unit in accordance with a space control value calculated based on the space target air temperature,
      seat controlling means for controlling the seat air conditioning unit in accordance with a seat control value calculated based on the space target air temperature; and
      the seat controlling means includes first seat air conditioning means which determines the seat control value in a steady air-conditioning state of the passenger compartment, and second seat air-conditioning means which determines the seat control value in a transition air-conditioning state of the passenger compartment.

2. The air conditioning system according to claim 1, wherein:
   the space control value of the space controlling means is set based on the space target air temperature in such a manner that an air amount blown into the passenger compartment is increased when the space target air temperature is lower than a first predetermined value or is higher than a second predetermined value higher than the first predetermined value; and
   the seat control value of the first seat air conditioning means is set based on the space target air temperature in such a manner that an air amount blown into the seat through the seat air conditioning unit is decreased when the space target air temperature is lower than the first predetermined value or is higher than the second predetermined value.

3. The air conditioning system according to claim 2, wherein the seat control value of the second seat air conditioning means is set based on the space target air temperature in such a manner that an air amount blown into the seat through the seat air conditioning unit is increased when the space target air temperature is lower than the first predetermined value or is higher than the second predetermined value.

4. The air conditioning system according to claim 1, wherein:
   the seat air conditioning unit includes an adjustment member which adjusts a mixing ratio between an air amount of conditioned air from the space air conditioning unit and an air amount of inside air from the passenger compartment;
   the first seat air-conditioning means calculates a seat target air temperature based on the space target air temperature; and
   the first seat air-conditioning means controls the adjustment member to only introduce inside air of the passenger compartment into the seat air conditioning unit when the seat target air temperature is lower than a predetermined temperature in cooling operation of the passenger compartment.

5. The air conditioning system according to claim 1, wherein:
   the seat air conditioning unit includes an adjustment member which adjusts a mixing ratio between an air amount of conditioned air from the space air conditioning unit and an air amount of inside air from the passenger compartment;
   the first seat air conditioning means calculates a seat target air temperature based on the space target air temperature; and
   the first seat air conditioning means controls the adjustment member to only introduce inside air of the passenger compartment into the seat air conditioning unit when the seat target air temperature is higher than a predetermined temperature in heating operation of the passenger compartment.

6. The air conditioning system according to claim 1, wherein the first seat air conditioning means stops operation of the seat air conditioning unit when an inside air temperature among the detection value of the thermal load of the vehicle is lower than a predetermined temperature in cooling operation of the passenger compartment.

7. The air conditioning system according to claim 1, wherein the first seat air conditioning means stops operation of the seat air conditioning unit when an inside air temperature among the detection value of the thermal load of the vehicle is higher than a predetermined temperature in heating operation of the passenger compartment.

8. The air conditioning system according to claim 1, wherein:
   the seat air conditioning unit includes an adjustment member which adjusts a mixing ratio between an air amount of conditioned air from the space air conditioning unit and an air amount of inside air from the passenger compartment;
   the control unit includes adjusting means for adjusting an operation position of the adjustment member.

9. The air conditioning system according to claim 1, wherein:
   the space air conditioning unit has a side face air outlet through which conditioned air is generally always blown toward a side upper side of the passenger compartment when the space air conditioning unit operates; and
   the seat air conditioning unit is connected to the space air conditioning unit so that conditioned air of the space air conditioning unit is introduced into the seat air conditioning unit through the side face air outlet.

10. The air conditioning system according to claim 1, wherein:
   the control unit has air-conditioning state determining means for determining whether or not an air conditioning state of the passenger compartment is in the steady air-conditioning state or in the transition air-conditioning state; and the air-conditioning state determining means determines the steady air-conditioning state or the transition air-conditioning state by a steady state discrimination based on the set temperature and an inside air temperature among the detection value of the thermal load.

11. The air conditioning system according to claim 1, wherein:
the control unit has air-conditioning state determining means for determining whether or not an air conditioning state of the passenger compartment is in the steady air-conditioning state or in the transition air-conditioning state; and
the air-conditioning state determining means determines the steady air-conditioning state or the transition air-conditioning state by a steady state discrimination based on the set temperature, an inside air temperature, and a seat set temperature set by a passenger on the seat.

12. The air conditioning system according to claim 11, wherein the air-conditioning state determining means changes a determining value of the steady state discrimination in accordance with a change of the seat set temperature.

13. The air conditioning system according to claim 11, wherein:
the seat set temperature is set by a seat operation member operating the seat air conditioning unit; and
the seat set temperature is a thermal sensation level of a seat surface, which is changed in a range between a cold level and a hot level.

14. The air conditioning system according to claim 1, wherein:
the control unit includes air-conditioning switching control means which gradually changes the seat control value from a value corresponding to the transition air-conditioning state to a value corresponding to the steady air-conditioning state, at an initial time of the steady air-conditioning state, immediately after the transition air-conditioning state.

15. The air conditioning system according to claim 1, wherein:
the seat air conditioning unit includes
a seat air conditioning case defining a seat air passage through which at least one of conditioned air from the space air conditioning unit and inside air from the passenger compartment flows toward a seat surface of the seat,
a seat temperature changing member which changes temperature of air blown from the seat surface through the seat air passage,
a seat blower disposed in the seat air passage, for generating an air flow in the seat air passage toward the seat surface, and
a seat temperature setting member which sets a thermal sensation level of the seat surface to a desired thermal sensation level;
the control unit has operation state determining member for determining an operation state of the passenger compartment; and
the control unit controls the seat temperature changing member and the seat blower to obtain the desired thermal sensation level of the seat surface, in the operation state of the space air conditioning unit.

* * * * *